United States Patent
Hafeneger et al.

(10) Patent No.: US 12,399,561 B2
(45) Date of Patent: Aug. 26, 2025

(54) RING DEVICE

(71) Applicant: Apple Inc., Cupertino, CA (US)

(72) Inventors: Stefan Hafeneger, Saratoga, CA (US); Amrith V Ram, Los Gatos, CA (US); Joel N Ruscher, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/410,521

(22) Filed: Jan. 11, 2024

(65) Prior Publication Data

US 2024/0281065 A1    Aug. 22, 2024

Related U.S. Application Data

(60) Provisional application No. 63/485,412, filed on Feb. 16, 2023.

(51) Int. Cl.
| | |
|---|---|
| *G06F 3/041* | (2006.01) |
| *G06F 3/01* | (2006.01) |
| *G06F 3/0346* | (2013.01) |
| *G06F 3/16* | (2006.01) |
| *G06K 7/10* | (2006.01) |

(Continued)

(52) U.S. Cl.
CPC .............. *G06F 3/014* (2013.01); *G06F 3/013* (2013.01); *G06F 3/017* (2013.01); *G06F 3/0346* (2013.01); *G06F 3/041* (2013.01); *G06F 3/167* (2013.01); *G06K 7/10297* (2013.01); *G06K 19/07762* (2013.01); *G06T 11/00* (2013.01);

(Continued)

(58) Field of Classification Search
CPC ............. G06F 1/163; G06F 2203/0331; G06F 2203/0381; G06F 3/011; G06F 3/013; G06F 3/014; G06F 3/017; G06F 3/0346; G06F 3/041; G06F 3/04842; G06F 3/167; G06K 19/07762; G06K 7/10297; G06T 11/00; G10L 15/22; G10L 25/78; H04B 5/73; H04B 5/77

See application file for complete search history.

(56) References Cited

U.S. PATENT DOCUMENTS

| | | |
|---|---|---|
| 11,829,831 B1 | 11/2023 | Ershov et al. |
| 2011/0187725 A1* | 8/2011 | Matsuda ................. G06F 3/14 345/473 |

(Continued)

OTHER PUBLICATIONS

U.S. Appl. No. 17/089,489, filed Nov. 4, 2020.

*Primary Examiner* — Insa Sadio

(74) *Attorney, Agent, or Firm* — Treyz Law Group, P.C.; Kendall P. Woodruff

(57) ABSTRACT

A ring device may be worn on a user's finger. The ring device may include near-field communications circuitry for emulating near-field communications tags based on biometric data and/or for logging health-related actions such as medicine intake. An inertial measurement unit in the ring device may detect pointing and other gestures for controlling equipment. A microphone may detect voice input and other sounds that can be used to infer the context in which the ring device is operating. Motion data from a first device may be used to determine a gaze direction towards a second device so that ring input may be directed towards the second device. A map of locations of different devices that can be controlled by the ring device may be generated using a combination of pointing input, voice input, gaze input, and/or touch input.

20 Claims, 16 Drawing Sheets

(51) Int. Cl.
*G06K 19/077* (2006.01)
*G06T 11/00* (2006.01)
*G10L 15/22* (2006.01)
*G10L 25/78* (2013.01)
*H04B 5/73* (2024.01)
*H04B 5/77* (2024.01)

(52) U.S. Cl.
CPC .............. *G10L 15/22* (2013.01); *G10L 25/78* (2013.01); *H04B 5/73* (2024.01); *H04B 5/77* (2024.01)

(56) References Cited

U.S. PATENT DOCUMENTS

| | | |
|---|---|---|
| 2012/0235883 A1 | 9/2012 | Border et al. |
| 2014/0118631 A1 | 5/2014 | Cho |
| 2015/0193018 A1 | 7/2015 | Venable et al. |
| 2015/0277559 A1 | 10/2015 | Vescovi et al. |
| 2016/0066827 A1 | 3/2016 | Workman et al. |
| 2018/0067621 A1 | 3/2018 | Bailey et al. |
| 2018/0120891 A1* | 5/2018 | Eim .................... H04M 1/0235 |
| 2020/0026352 A1 | 1/2020 | Wang et al. |
| 2021/0037319 A1* | 2/2021 | Dyonisio ............... H04R 3/005 |
| 2021/0052177 A1 | 2/2021 | Mendenhall et al. |

* cited by examiner

RING DEVICE

This application claims the benefit of provisional patent application No. 63/485,412, filed Feb. 16, 2023, which is hereby incorporated by reference herein in its entirety.

FIELD

This relates generally to electronic devices and, more particularly, to wearable electronic devices.

BACKGROUND

Users often interact with multiple electronic devices throughout the day. Some electronic devices offer health-monitoring options, some electronic devices offer remote control functionality, and other electronic devices have wearable housings that can be worn on the user's body. The user may wish to take advantage of one or more of these features, but it can be cumbersome to constantly switch between electronic devices.

SUMMARY

Electronic devices in a system may be controlled by a ring device that is worn on a user's finger. The ring device may include near-field communications circuitry for emulating near-field communications tags based on biometric data and/or for logging health-related actions such as medicine intake.

An inertial measurement unit in the ring device may detect pointing and other gestures for controlling equipment. A microphone may detect voice input and other sounds that can be used to infer the context in which the ring device is operating.

Motion data from a first device may be used to determine a gaze direction towards a second device so that ring input may be directed towards the second device. A map of locations of different devices that can be controlled by the ring device may be generated using a combination of pointing input, voice input, gaze input, and/or touch input.

DETAILED DESCRIPTION

Figure 1:
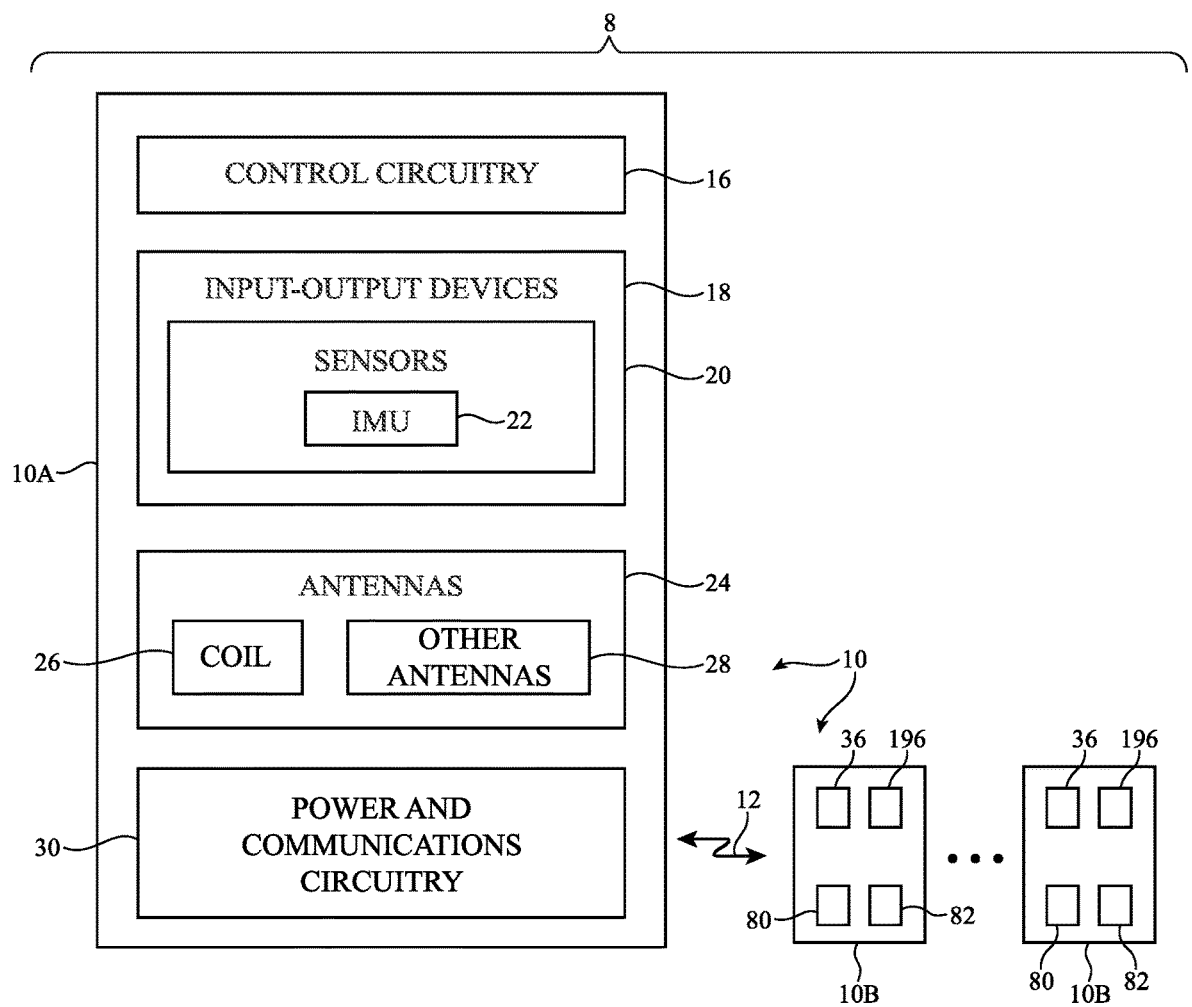
FIG. 1 is a schematic diagram of an illustrative system with electronic devices in accordance with some embodiments.

Electronic devices that are configured to be mounted on the body of a user may be used to gather user input and/or to provide a user with output. For example, electronic devices that are configured to be worn on one or more of a user's fingers, which are sometimes referred to as ring devices, finger devices, or finger-mounted devices, may be used to gather user input and/or to supply output. A ring device may, as an example, include an inertial measurement unit with an accelerometer, gyroscope, and magnetometer for gathering information on finger motions such as finger taps or free-space finger gestures, may include touch and/or force sensors for gathering touch input, force input, and/or biometric data from a user's finger, and may include other sensors for gathering information on the interactions between the ring device, the surrounding environment, the user's fingers, and other electronic devices in the surrounding environment. The ring device may include a haptic output device to provide the user's finger with haptic output and may include other output components.

One or more ring devices may gather user input from a user. The user may use ring devices in operating a virtual reality or mixed reality device (e.g., head-mounted equipment such as glasses, goggles, a helmet, or other device with a display). During operation, the ring devices may gather user input such as information on interactions between the ring device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the ring devices. Haptic output may be used, for example, to provide tactile feedback in response to touch input or other user input to the ring device, may be used to provide the fingers of a user with a desired texture sensation as a user is touching a real or virtual object, and/or may be used create detents and other haptic effects.

Ring devices can be worn on any or all of a user's fingers (e.g., the index finger, the index finger and thumb, three of a user's fingers on one of the user's hands, some or all fingers on both hands, etc.).

Users can use the ring devices to interact with any suitable electronic equipment. For example, a user may use one or more ring devices to interact with a virtual reality or mixed reality system (e.g., a head-mounted device with a display), to supply input to a desktop computer, tablet computer, cellular telephone, watch, ear buds, or other accessory, or to interact with other electronic equipment.

A ring device may be configured to interact with a system of one or more electronic devices. As an example, the system may have a first device that can gather user input and may have a second device that can be controlled by the first device. The first and second device may also be operated independently, if desired. In an illustrative configuration, the first device in this type of system may be a ring device (sometimes referred to as a controller, ring controller, finger-mounted device, finger device, etc.). The ring device may have a ring shape that allows the ring device to be worn on a body part of a user (e.g., around a user's finger, wrist, arm, leg, ankle, neck, head, and/or other body part). In an illustrative configuration, which may sometimes be described herein as an example, the ring device has a finger-ring housing that is configured to be worn on a user's finger.

The second device in this type of system may be a portable electronic device such as a cellular telephone, tablet computer, laptop computer, head-mounted device, a desktop computer, a television, a speaker, household electronic equipment such as a lamp or other lighting device, a thermostat, a security system, and/or any other suitable electronic equipment. Because the second device may be operated by a user in conjunction with the first device, the second device may sometimes be referred to as a companion device or a host device.

Use of a ring device may facilitate the gathering of user input. During operation of a companion device, a user may wish to supply user input to the companion device in the form of hand gestures, touch input, force input, voice input, pointing input, gaze input, other user input involving the position of the user's body (e.g., the location, orientation, and movement of one or more fingers and/or other body parts), and/or other user input. The ring device may have sensors such as inertial measurement units and/or other sensors that allow such body-based input to be gathered. Because a ring device may be worn throughout the day, a ring device will generally be immediately available to the user, unlike devices that are stored in a user's pocket or more distant locations. This facilitates interactions between the ring device and objects in the user's environment. For example, a ring device can easily be brought into close proximity with near-field communications tags in the user's environment.

A ring device may be configured to control multiple electronic devices in the user's environment. The ring device and/or a host device such as a cellular telephone may store a map of locations of electronic devices in the user's home, office, etc. The map may indicate the absolute and/or relative locations of various pieces of electronic equipment throughout a given building and/or in one or more different rooms of the building. For example, a ring device and/or a host device may store a living room map with stored locations of a television, a living room speaker, a thermostat, and a living room lamp, a kitchen map with stored locations of various kitchen appliances, an office map with stored locations of a desktop computer, an office speaker, and an office lamp, a bedroom map with stored locations of a bedroom lamp, a laptop computer, and a bedroom speaker, etc. When it is desired to create and store a new map for a given room with electronic devices, the user may wear the ring device while providing input to the ring device and/or a host device (e.g., by pointing, gesturing, or gazing towards the different electronic devices, by providing voice input, touch input, force input, or other user input, etc.). Location information, position information, and/or orientation information may be gathered from the ring device and/or from one or more host devices to determine the absolute and/or relative locations of the electronic devices in the room based on the user input to the ring device and/or the host device.

An illustrative system that includes a ring device is shown in FIG. 1. As shown in FIG. 1, system 8 may include multiple electronic devices 10 such as ring device 10A and companion devices 10B (sometimes referred to as host devices). Devices 10A and 10B may communicate wirelessly, as shown by wireless signals 12. For example, device 10A may gather user input and this user input may be wirelessly conveyed to device 10B to use in controlling objects presented on a display (e.g., by moving pointers, selecting and moving visual items, making menu selections, etc.), to adjust audio playback, to change settings (e.g., temperature, brightness, color temperature, operating mode, etc.), and/or to otherwise control the operation of device 10B.

Electronic devices 10 may include computing devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10A is a finger-mounted device having a ring-shaped housing and device 10B is a cellular telephone, tablet computer, laptop computer, wristwatch device, head-mounted device, a device with a speaker, a lamp or other light source, a thermostat, a household appliance, or other electronic device (e.g., a device with a display, audio components, and/or other output components that can be adjusted using input to ring device 10A). In general, devices 10A and 10B may have the same components or may have different components (e.g., some of the components of device 10A may not be present in device 10B and/or some of the components of device 10B may not be present in device 10A).

Devices 10A and 10B may include control circuitry 16 and control circuitry 36, respectively. Control circuitry 16 and 36 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 16 and 36 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10A and 10B and/or to support communications between equipment in system 8 and external electronic equipment, control circuitry 16 may communicate using communications circuitry 30 and control circuitry 36 may communicate using communications circuitry 196. Circuitry 30, which may be considered to form part of control circuitry 16, may include near-field communications circuitry and may include radio-frequency transceiver circuitry such as cellular telephone communications circuitry, wireless local area network communications circuitry, short distance wireless communications circuitry such as Bluetooth® circuitry, ultra-wideband (UWB) radio frequency transceiver circuitry, and/or other wireless radio-frequency transceiver circuitry (sometimes referred to as non-near-field communications circuitry). Circuitry 30 may also include wireless power circuitry.

Communications circuitry 30 and/or 196 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals may be received from a constellation of satellites orbiting the earth.

Circuitry 30 and/or 196, which may sometimes be referred to as control circuitry, control and communications circuitry, or power and communications circuitry, may support bidirectional wireless communications between devices 10A and 10B over wireless link 12 (e.g., a wireless local area network link, a near-field communications link, a Bluetooth® link, a WiFi® link, a 60 GHz link or other millimeter wave link, an ultra-wideband radio frequency link, etc.). Devices 10A and 10B may also include power circuits for transmitting and/or receiving wired and/or wireless power and may include batteries. In configurations in which wireless power transfer is supported between devices 10A and 10B, in-band wireless communications may be supported using inductive power transfer coils (as an example).

Power and communications circuitry 30 may use antennas 24 to send and receive wireless signals such as wireless power signals and wireless communications signals (e.g., wireless data). Antennas 24 may include one or more coils such as coil 26 (sometimes referred to as coil antennas, near-field communications antennas, inductive coils, etc.) and may include other antennas 28 (e.g., antennas such as inverted-F antennas, planar inverted-F antennas, slot antennas, patch antennas, and/or other antennas). Antennas 28 may sometimes be referred to as non-near-field communications antennas.

Circuitry 30 may use coil 26 to transmit and/or receive near-field signals at 13.56 MHz and/or other suitable near-field communications frequencies. These near-field signals may by conveyed between device 10A and device 10B when devices 10A and 10B are separated by relatively modest distances (e.g., distances of less than 20 cm, or other limited distance associated with near-field electromagnetic signals). These limited-range wireless communications may sometimes be referred to as near-field communications and take place when coil 26 is near-field coupled to a corresponding coil in device 10B or in other locations.

Coil 26 may also be used in receiving and/or transmitting wireless power. For example, coil 26 may be used to receive alternating-current wireless power signals from a wireless charging puck or mat in the vicinity of device 10A. Device 10A may use a rectifier in the wireless power circuitry of circuitry 30 to convert received alternating-current signals from coil 26 into direct-current power for operating device 10A.

Wireless communications using antennas 28 may use radio-frequency signals in frequency bands of at least 100 MHz, at least 1 GHz, less than 100 GHz, and/or other frequencies). These wireless communications may take place over larger distances than near-field communications using coil 26. For example, non-near-field wireless communications using non-near-field antennas may take place over distances of at least 20 cm, at least 100 cm, less than 50 m, 1-50 m, and/or other suitable non-near-field communications distances).

The communications circuitry of device 10A may allow device 10A to communicate (transmit and/or receive data) with other electronic devices such as device 10B. For example, control circuitry 16 (e.g., communications circuitry 30 and/or other control and communications circuitry in device 10A) may be used to allow wired and/or wireless control commands and other communications to be conveyed between device 10A and other equipment in system 8 such as cellular telephones, tablet computers, laptop computers, desktop computers, head-mounted devices, handheld controllers, finger devices, wristwatch devices, other wearable devices, keyboards, computer mice, remote controls, speakers, accessory displays, accessory cameras, and/or other electronic devices.

Devices 10A and 10B may include input-output devices such as devices 18 and 80. Input-output devices 18 and/or 80 may be used in gathering user input, in gathering information on the environment surrounding the user, and/or in providing a user with output. Input-output devices 18 and 80 may include sensors. For example, devices 18 may include sensors 20. Sensors 20 in devices 18 and/or sensors in devices 80 may include sensor circuitry such as force sensors (e.g., strain gauges, capacitive force sensors, resistive force sensors, etc.), grip sensors, resistance sensors, audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping display, and/or a touch sensor or force sensor that forms a button, trackpad, or other input device not associated with a display), and other sensors. Touch sensors may be based on an array of capacitive touch sensor electrodes, acoustic touch sensor structures, resistive touch components, force-based touch sensor structures, a light-based touch sensor, or other suitable touch sensor arrangements. In some configurations, device 10A may have a force sensor for gathering force input (e.g., a two-dimensional force sensor may be used in gathering force input). If desired, sensors 20 may include optical sensors such as optical sensors that emit and detect light, ultrasonic sensors, optical touch sensors, optical proximity sensors, and/or other touch sensors and/or proximity sensors, monochromatic and color ambient light sensors, visible light image sensors, infrared image sensors (e.g., thermal image sensors), fingerprint sensors (e.g., optical fingerprint sensors, capacitive fingerprint sensors, ultrasonic fingerprint sensors, etc.), temperature sensors (e.g., thermal sensors that sense contact by fingers and other user body parts by measuring temperature changes, thermal sensors that measure the temperature of the user's body and/or the surrounding environment), ultraviolet light sensors for detecting an amount of ultraviolet light exposure, sensors for measuring three-dimensional non-contact gestures ("air gestures"), pressure sensors, health sensors (e.g., electrocardiogram sensors, photoplethysmogram sensors, blood oxygen level sensors, blood flow sensors, heart rate sensors, etc.), radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components that capture images of the spots created as the beams illuminate target objects, and/or other three-dimensional image sensors), facial recognition sensors based on three-dimensional image sensors, and/or other sensors.

Device 10A and/or device 10B may include position sensors for monitoring the location of device 10A and/or device 10B, the orientation of device 10A and/or device 10B, and/or the motion of device 10A and/or device 10B so that these measurements may be used, for example, as user input that is wirelessly conveyed to other devices 10B. Position sensors in device 10A and/or device 10B may include accelerometers, magnetic sensors such as compass sensors, gyroscopes, inertial measurement units such as inertial measurement unit 22 containing some or all of these sensors, radio-frequency sensors, and optical sensors (e.g., image sensors, proximity sensors, etc.). For example, an infrared time-of-flight image sensor may be used to measure the time that it takes for an infrared light pulse to reflect back from objects in the vicinity of device 10A and/or device 10B, which may in turn be used to determine the distance to those objects.

Visible imaging systems such as a camera in device 10A and/or device 10B may also be used to determine the position of objects in the environment. For example, control circuitry 16 and/or 36 may use image sensors for simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 16 and/or 36 may rely entirely upon image sensors to perform simultaneous localization and mapping, or control circuitry 16 and/or 36 may synthesize image data with range data from one or more distance sensors (e.g., light-based proximity sensors, three-dimensional image sensors, etc.) in device 10A and/or device 10B. If desired, control circuitry 36 may use a display in device 10B to display a visual representation of the mapped environment. Ring device 10A may not include a display due to space constraints, so using a display on companion device 10B to display a visual representation of the mapped environment allows the user to view objects in the user's environment that can be mapped and controlled with ring device 10A. This is merely illustrative, however. If desired, ring device 10A may include a display.

Radio-frequency tracking devices may be included in sensors 20 of device 10A and/or in devices 80 of devices 10B to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10A and/or 10B to help determine the location and position of devices 10A and/or 10B relative to the beacons. If desired, devices 10A and/or 10B may include beacons. Frequency strength (received signal strength information), beacon orientation, time-of-flight information, angle-of-arrival information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Device 10A and/or device 10B may include other input-output devices 18 and/or 80. These other devices may include mechanical devices for gathering input such as buttons, joysticks, scrolling wheels, keypads, keyboards, tactile switches, and other devices for gathering user input. During operation, device 10A may use sensors 20 and/or other input-output devices to gather user input and/or other input. For example, buttons may be used to gather button press input, touch and/or force sensors can be used for gathering user touch input and/or force input, biometric sensors may be used to detect a user's fingerprint for enrollment and/or authentication purposes, accelerometers may be used to detect movement input (e.g., tapping input such as single taps, double taps, etc., swiping input, waving input, shaking input, or other movement input involving slight or large movements of device 10A), microphones may be used for gathering audio input and/or detecting sounds such as swiping sounds, tapping sounds, keyboard sounds, etc.

Input-output devices 18 and/or 80 may include output devices such as haptic output devices, speakers or other devices for providing audio output, status indicators, displays, and other visual output devices, and/or other input-output circuitry. Haptic output devices may produce motion that is sensed by the user (e.g., through the user's fingers). Haptic output devices in devices 18 and/or 80 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10A and/or 10B (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10A and/or 10B). In some situations, actuators for creating forces in device 10A may be used in squeezing a user's finger and/or otherwise directly interacting with a user's finger. In other situations, these components may be used to interact with each other (e.g., by creating a dynamically adjustable electromagnetic repulsion and/or attraction force between a pair of devices 10 and/or between device(s) 10A and device(s) 10B using electromagnets).

If desired, device 10A may include additional components. These additional components may include, for example, a battery or other energy storage device, connector ports for supporting wired communications with ancillary equipment and for receiving wired power, and other circuitry.

Figure 2:
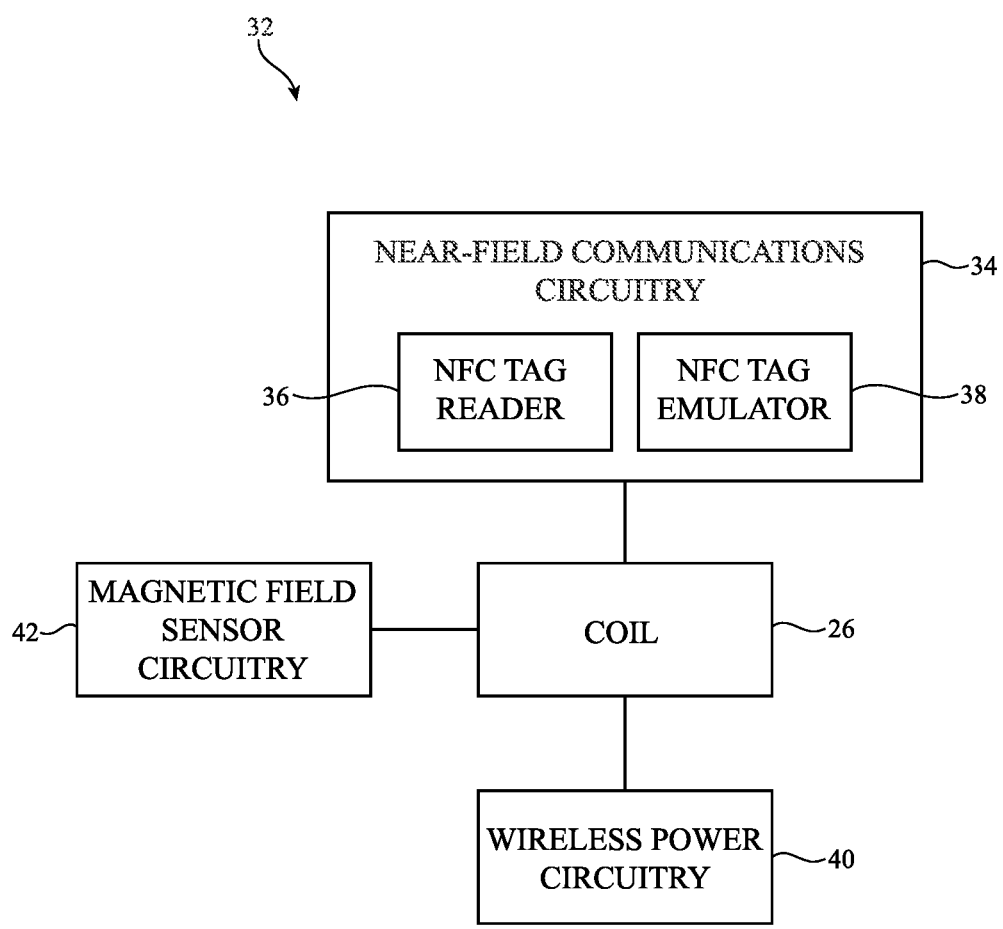
FIG. 2 is a circuit diagram of illustrative circuitry for a ring device in accordance with some embodiments.

FIG. 2 is a circuit diagram of illustrative wireless circuitry 32 in device 10A (e.g., circuitry included in circuitry 16 and/or circuitry 30) that may be used to transmit and/or receive wireless signals with one or more coils such as coil 26. As shown in FIG. 2, circuitry 32 may include near-field communications circuitry 34. Circuitry 34 may transmit and/or receive near-field communications signals with coil 26 using any suitable near-field communications protocol. In an illustrative configuration, circuitry 34 includes a near-field communications tag reader (NFC reader circuit 36) and a near-field communications tag emulator (NFC tag circuit 38). Circuits 36 and 38 communicate using radio-frequency identification (RFID) near-field communications protocols. Other near-field communications protocols may be used with circuitry 32, if desired.

Wireless power circuitry 40 may include a wireless power transmitter (e.g., an inverter that is coupled to coil 26 and that drives alternating-current drive signals through coil 26 to cause coil 26 to emit wireless power signals) and/or may include a wireless power receiver (e.g., a rectifier that is coupled to coil 26 and that rectifies alternating-current signals that are received by coil 26 from a wireless power transmitter). Direct-current power that is produced by rectifying the received alternating-current signals from coil 26 may be used in powering the components of device 10A and/or may be used in charging a power storage device in device 10A such as a battery. Circuitry 34 and circuitry 40 may be coupled to a shared coil (e.g., both of these circuits may share coil 26 of FIG. 2) or circuitry 34 and circuitry 40 may be provided with separate respective coils. Coil sharing arrangements may help reduce the size and weight of device 10A.

In an illustrative arrangement, circuitry 32 may also include magnetic sensor circuitry. Circuitry 32 may, as an example, include magnetic sensor circuitry 42 that measures magnetic fields that have been received using coil 26. The magnetic fields that are sensed in this way may be produced as reference magnetic fields by device 10B (e.g., so that circuitry 42 can sense the position of device 10A relative to this reference magnetic field). Circuitry 42 may be coupled to coil 26 (e.g., a coil shared with circuitry 34 and/or circuitry 40) and/or may be coupled to one or more separate coils. Multiple orthogonal coils (e.g., three orthogonal coils which may or may not include coil 26) may be coupled to circuitry 42 to help provide circuitry 42 with magnetic field strength information in three dimensions. In some illustrative arrangements, circuitry 42 may energize coil 26 (e.g., so that device 10B can sense reference fields produced by device 10A in addition to or instead of allowing device 10A to measure the position of device 10A relative to device 10B by analyzing reference fields received by device 10A from device 10B).

In addition to or instead of using one or more coils such as coil 26 for position sensing operations in which magnetic fields are measured, device 10 may include other circuitry for measuring position. Position sensing circuitry may be used to measure the orientation of device 10 (e.g., the amount of rotation of device 10 about each of the X, Y, and Z axes), the location of device 10 (e.g., in X, Y, and Z), and may be used to measure orientation and location changes (e.g., the position sensing circuitry may be used to detect translational motion and/or rotational motion). The position sensing circuitry may be based on one or more inertial measurement units (e.g., sensors that include accelerometers, magnetometers, compasses, and/or gyroscopes) and/or may include other position sensing technologies such as visual inertial odometry (VIO) sensors or other position sensors that operate at least partly using light and/or radio-frequency sensors such as ultra-wideband (UWB) sensors that use short range broad spectrum radio-frequency waves at gigahertz frequencies to determine the position of device 10 by interacting with other UWB equipment in the vicinity of device 10, etc.

Near-field communications tag emulator 38 may be configured to emulate more than one near-field communications tag. The different tags may be associated with different users, different access points, different user profiles, etc. For example, a first near-field communications tag may be used to gain access to a first area of a building while a second near-field communications tag may be used to gain access to a second area of a building. As another example, a first user may be authenticated (e.g., using a biometric sensor such as a fingerprint sensor in device 10A) to unlock a first near-field communications tag associated with the first user, while a second user that is authenticated using the fingerprint sensor in device 10A may have access to a second near-field communications tag associated with the second user (e.g., in arrangement where ring device 10A is worn by multiple users).

Figure 3:
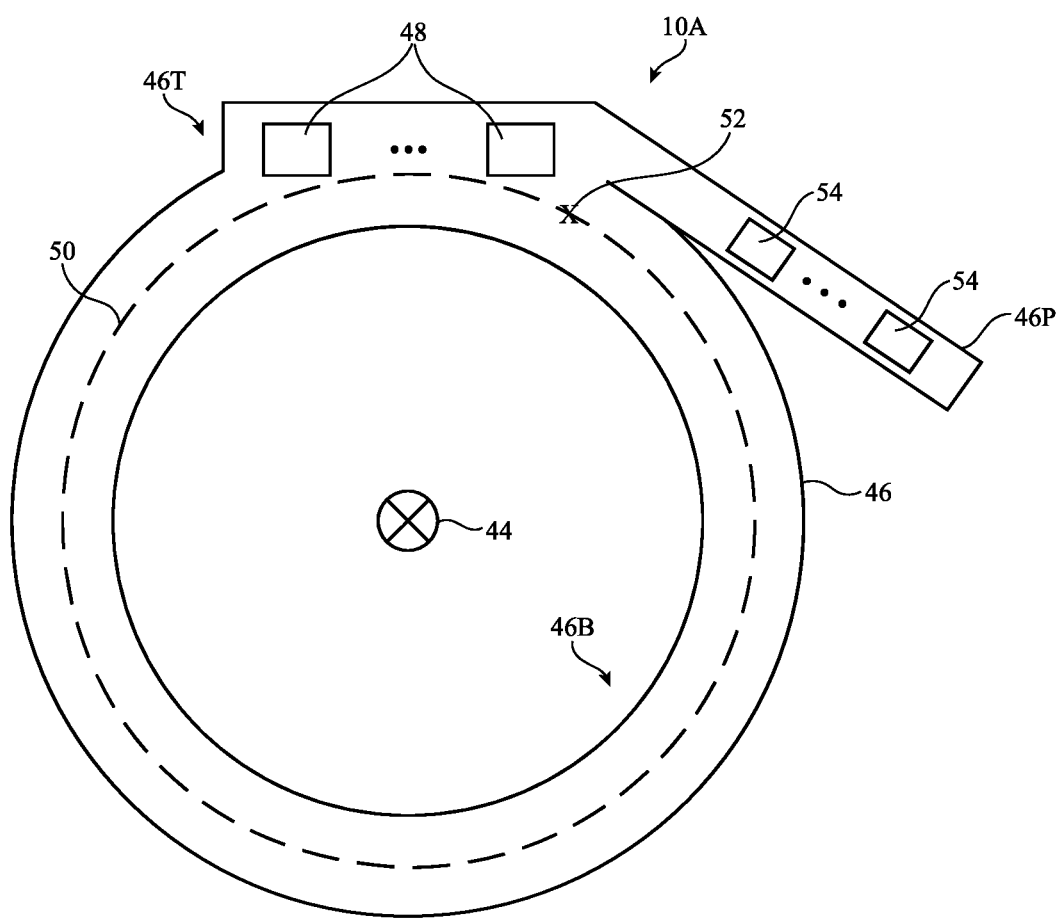
FIG. 3 is a side view of an illustrative ring device in accordance with some embodiments.

FIG. 3 is a front side view of device 10A (e.g., a view of device 10A in a direction parallel to axis 44, which runs into the page in the orientation of FIG. 3 and which is aligned with the longitudinal axis of a user's finger when device 10A is worn on the user's finger). As shown in FIG. 3, device 10A may include components 48 that are interconnected by signal paths 50. Signal paths 50 may be formed on one or more printed circuits (e.g., rigid printed circuits formed from rigid printed circuit board material, flexible printed circuits formed from flexible sheets of polyimide or other bendable polymer layers, and/or printed circuits that include both rigid and flexible areas, sometime referred to as rigid flex circuits) and/or one or more other dielectric members that serve as substrates (e.g., members formed from polymer, glass, ceramic, etc.) that are shaped using three-dimensional printing (e.g., to form a three-dimensional substrate of the type sometimes referred to as a three-dimensional printed circuit board), molding, machining, and/or other fabrication techniques. The substrate for signal paths may, in some embodiments, be formed from portions of a dielectric housing for device 10A.

Signal paths 50 may include metal traces patterned to form multiple turns for coil 26. Wires, traces on laser-direct structuring substrates, metal members formed by stamping, machining, and/or other fabrication techniques, and/or other conductive structures in device 10A may also be used in forming paths 50, if desired. In an illustrative arrangement, the signals lines that form the turns of coil 26 extend in a ring within ring-shaped housing 46 (e.g., coil 26 is formed from signal paths that wrap around the finger-shaped opening in the center of device 10A and that therefore wrap around a user's finger). Printed circuit(s) on which signal paths 50 for coil 26 are formed may have an elongated shape (e.g., the shape of an elongated strip that is bent into a ring). This elongated printed circuit may have opposing first and second ends that are connected to each other using connections 52 so that the turns of coil 26 extend in a continuous spiral around the user's finger. A pair of terminals at the ends of coil 26 may be coupled to circuitry such as near-field communications circuitry 34, wireless power circuitry 40, and/or magnetic field sensor circuitry 42 (see, e.g., FIG. 2). Connections 52 may include conductive joints (solder, connections, connections formed by contacts in connectors, conductive adhesive connections, welds, etc.). These conductive joints may join the metal traces or other signal paths (e.g., wires, etc.) to form the turns of coil 26. If desired, a conductive housing structure for device 10 such as some or all of ring-shaped metal housing may be configured to form one or more of the turns of coil 26 (e.g., housing 46 may form some or all of signal paths 50). As an example, housing 46 may be formed from a spiral metal member with interlocking polymer or other dielectric for structural support. In this configuration, the spiral metal member may form multiple turns for coil 26. Arrangements in which a metal ring-shaped housing for device 10 forms a single-turn coil may also be used, if desired. If desired, slots for forming slot antennas, and/or other antenna structures (e.g., inverted-F antennas, patch antennas, etc.) may be formed from conductive portions of device 10 such as metal portions of housing 46. As an example, housing 46 may include a metal ring and a slot antenna may be formed from a slot-shaped opening in the ring.

Components 48 may include integrated circuits, discrete components, sensors, and/or other circuitry (see, e.g., control circuitry 16, input-output devices 18, antennas 24, and power and communications circuitry 30). Components 48 may be mounted on the same printed circuit that is used to form coil 26 or may be mounted on one or more different printed circuits (e.g., using solder, etc.).

Device 10A may have a housing that is configured to be worn on a user's finger such as finger-ring housing 46. Components 48 and signal paths 50 may be mounted in housing 46 (e.g., in an interior portion of housing 46 that is separated from the exterior environment surrounding housing 46 by housing walls and/or other housing structures). Housing 46 may have any suitable shape. For example, the housing may be configured to form a circular or oval ring with a central finger-shaped opening that is configured to receive the finger of a user and may or may not have optional protrusions such as top protrusion 46T and lateral protrusion 46P that protrude from a non-protruding ring-shaped portion of housing 46 such as lower ring-shaped portion 46B. Housing structures for housing 46 (e.g., housing walls, internal support structures, etc.) may be formed from polymer, metal, glass, fabric, crystalline materials such as sapphire, other materials, and/or combinations of these materials. Electrical components 48 and 54 (e.g., control circuitry, input-output devices, etc.) may be mounted in an interior portion of housing 46, may be embedded within housing wall structures, and/or may include structures mounted on exterior surfaces or near exterior surfaces of housing 46. In some configurations, electrical components 48 and 54 may operate through housing windows that exhibit radio-frequency transparency and/or that exhibit optical transparency. In other configurations, portions of housing 46 (e.g., ring-shaped portion 46B and/or protruding portion 46T) may be formed from materials that are compatible with the operation of components 48. For example, portion 46B, 46T and/or 46P may be formed partly or completely from dielectric to reduce potential interactions between metal structures and the wireless operations of device 10A.

If desired, ring device 10A may be entirely cylindrical, may be entirely curved (e.g., asymmetrically curved or symmetrically curved), or may have one or more planar portions. Planar surfaces may be used to provide tactile differences between different portions of housing 46 to indicate where different input-output devices are on ring device 10A and/or to provide flat surfaces for receiving user input. This is merely illustrative. If desired, different sensing and/or output areas or ring device 10A may be designated with different surface textures, colors, labels, indicator lights, etc., while allowing housing 46 to have a fully curved ring shape or any other suitable shape.

During operation, device 10A may be used in sensing the environment surrounding device 10A and/or may be used in gathering position information (e.g., information on the orientation, location, and/or motion of device 10A). For example, an inertial measurement unit or other position sensor may monitor the position of device 10A. Magnetic sensing circuitry 42 and/or other sensors (e.g., optical sensors on device 10A) may also be used in gathering information on the position of device 10A. Position information that is sensed in device 10A and other input gathered by sensors 20 (e.g., button press input, touch sensor input, force sensor input, etc.) may be wirelessly transmitted to device 10B to serve as control input. If desired, device 10B may use cameras, magnetic sensing circuitry, and/or other sensors to track the position of device 10A. Using sensing circuitry in device 10A and/or sensing circuitry in device 10B in this way, a user may move device 10A, may point device 10A, and/or may otherwise provide user input to device 10A and system 8 to control device 10B by positioning device 10A appropriately (e.g., by moving device 10A in an air gesture, by moving device 10A while device 10A is being tracked in a virtual reality or mixed reality environment created by device 10B, etc.).

In some configurations, an accelerometer or other sensor in device 10A can detect when device 10A taps against an external object and/or shakes device 10A. Taps or shakes or other user input may be used, for example, to invoke near-field communications reader functions and/or other near-field circuit operations that can be used in gathering near-field communications information (e.g., NFC tag information) from NFC tags in the user's environment. This tag information can then be provided from device 10A to deice 10B (e.g., using non-near-field communications such as Bluetooth® communications or other short-range wireless communications and/or using near-field communications).

Top portion 46T, lateral protruding portion 46P, and/or or other portions of housing 46 device 10A may overlap one or more sensors and/or output devices. For example, portion 46T may overlap a fingerprint sensor for gathering user fingerprints (e.g., for user authentication), a touch sensor for gathering touch input, a button (e.g., a solid-state button, a capacitive button, or a mechanical button with a tactile switch) for gathering button press input, a force sensor for gathering force input, an electrocardiogram sensor for gathering heart rate data, a haptic output device for gathering haptic output, a speaker for providing audio output, and/or other input-output devices 18. Portion 46B and/or other exposed portions of the outer surface of housing 46 may overlap a touch sensor for gathering one-dimensional or two-dimensional touch input, a temperature sensor for sensing ambient temperature and/or body temperature, an ultraviolet light sensor for detecting ultraviolet light exposure, an inertial measurement unit such as inertial measurement unit 22 of FIG. 1, a photoplethysmogram sensor for measuring blood oxygen levels, blood flow, and/or heart rate, an ambient light sensor for measuring the intensity and/or color of ambient light, and/or may overlap other sensors.

Ring devices such as illustrative ring device 10A may include radio-frequency sensor circuitry, inertial measurement unit circuitry, and/or other sensor circuitry to gather information on the position of the user's finger (e.g., information on the current location, movement, and/or orientation of the finger). This information can be gathered in three dimensions so that a user may provide a system with three-dimensional gesture input, may include user pointing input (e.g., input associated with the direction in which the finger and device 10A are pointing), may include tap input (e.g., input associated with abrupt striking motions of the finger against a surface that can be detected using an accelerometer or other sensor), etc.

If desired, sensor circuitry in the ring (e.g., touch and/or force sensors, etc.) may wrap around some or all of the ring's exposed outer surface. A user may provide finger input to the sensor (e.g., touch and/or force input) using the user's thumb or other finger (e.g., an index finger of an opposing hand from the ring finger on which the ring is being worn). The user may press against a particular location on the sensor (e.g., a particular portion of the outer surface of the ring) or may move a finger along the surface of the ring in one dimension or two dimensions. As an example, a user may move the tip of a finger around the circumference of the ring or may move the fingertip across the ring parallel to the length of the user's finger. As another example, two-directional touch input may be gathered (e.g., as the user moves a finger around the ring and/or across a planar surface of the ring such as planar surfaces on top portion 46T and/or lateral protruding portion 46P). In this way, the user may provide touch input such as touch gesture input, touch scrolling motions, touch selection input (e.g., tap input), etc. The touch input may be used as pointing control input (e.g., to move a cursor or other visual element in the user's field of view). If desired, multitouch input (e.g., pinch-to-zoom input) may also be gathered using the touch sensor. User input to the ring may be used for scrolling commands, up/down adjustment commands (e.g., for adjusting parameters such as audio playback volume, television channel, etc.), source selection, joystick commands and/or other pointing input, and/or other user input.

Force input may be provided by pressing down on portion 46T or other area of the ring surface. User input gathered using a ring (e.g., touch sensor input, force sensor input, position, orientation, and/or motion sensor input, radio-frequency sensor input on position, orientation, and/or motion, microphone input, and/or other user input) can be gathered in real time so that the ring can serve as a remote control, pointing device, and/or other controller. By tracking the path followed by a ring or other device in two or three dimensions, an accelerometer and/or other inertial measurement sensor circuitry and/or radio-frequency sensor circuitry may be used in measuring the motion of the finger (e.g., to sense letters and other characters that a user traces out with the tip of the finger, to sense gestures such as gestures in a particular direction, gestures in which a pattern of motion indicates a particular command, etc.).

Sensor(s) in device 10A may be used for health monitoring. For example, ring device 10A that is being worn on a user's finger may gather heart rate information, blood oxygen readings, skin temperature readings, and/or other health data by measuring the user's finger. Electrocardiogram readings may be gathered using ring device 10A. Ring device 10A may have a first electrocardiogram electrode on an inner surface that contacts a user's finger on one side of the user's body (e.g., the right side). Ring device 10A may also have a second electrocardiogram electrode on an outer surface that can be placed in contact with a user's finger, hand, arm, or other exposed skin on an opposing side of the user's body (e.g., the left side). When the electrodes form a circuit through the user's body in this way, electrocardiogram data may be gathered by electrocardiogram sensor circuitry in the ring.

Due to space constraints in ring device 10A, ring device 10A may have different sets of components depending on the desired functionality of ring device 10A. For example, a motion-controlled remote control ring device 10A may have a first set of components that are specific to controlling external devices 10B using motion input (e.g., an inertial measurement unit, a touch and/or force sensor, and a haptic output device); a voice-controlled ring device 10A may have a second set of components that are specific to voice-controlled assistant functions (e.g., an inertial measurement unit, a microphone, a speaker, and a touch and/or force sensor); a near-field communications ring device 10A may include a third set of components that are specific to near-field communications (e.g., two-way near-field communications circuitry, an inertial measurement unit, and a touch and/or force sensor); and a health-monitoring ring device 10A may include a fourth set of components that are specific to health-related functions such as an electrocardiogram sensor, a photoplethysmogram sensor, a temperature sensor, an ultra-violet light sensor, an inertial measurement unit, and a grip sensor. These examples are merely illustrative. If desired, different and/or additional components may be included in ring device 10A based on its desired functionality. Arrangements in which components of ring device 10A are modular and can be selectively removed, added, and/or replaced by other components (e.g., to change ring device 10A from a remote control ring device to a health-monitoring ring device) may also be used.

Figure 4:
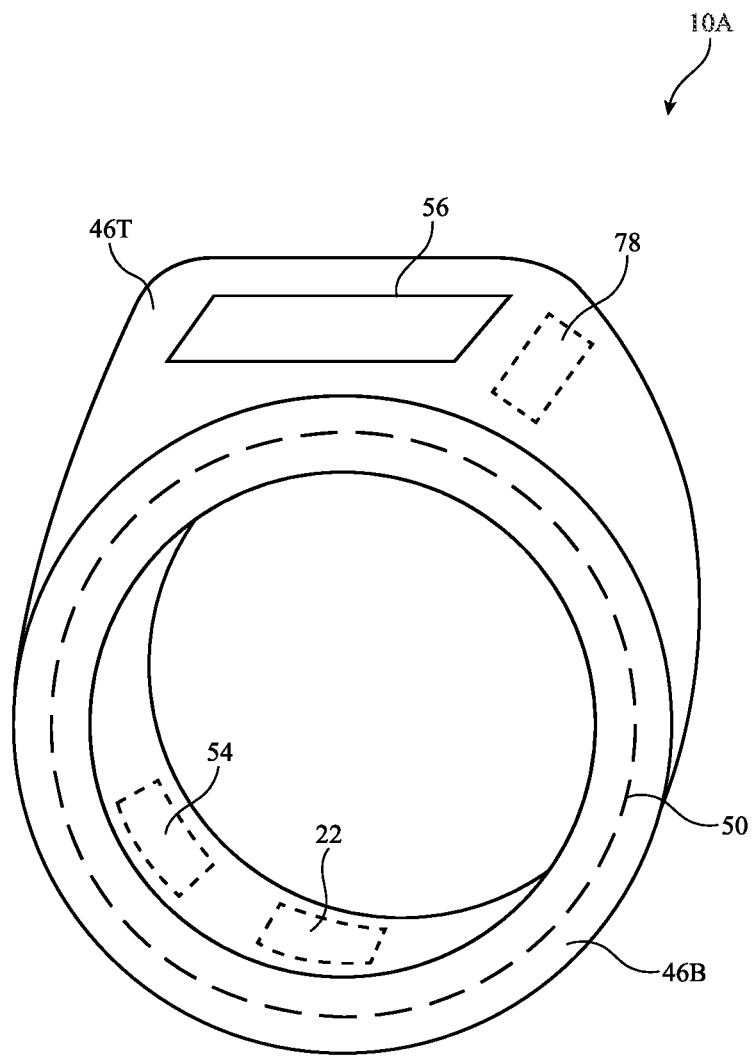
FIG. 4 is a perspective view of an illustrative motion-controlled ring device in accordance with some embodiments.
Figure 5:
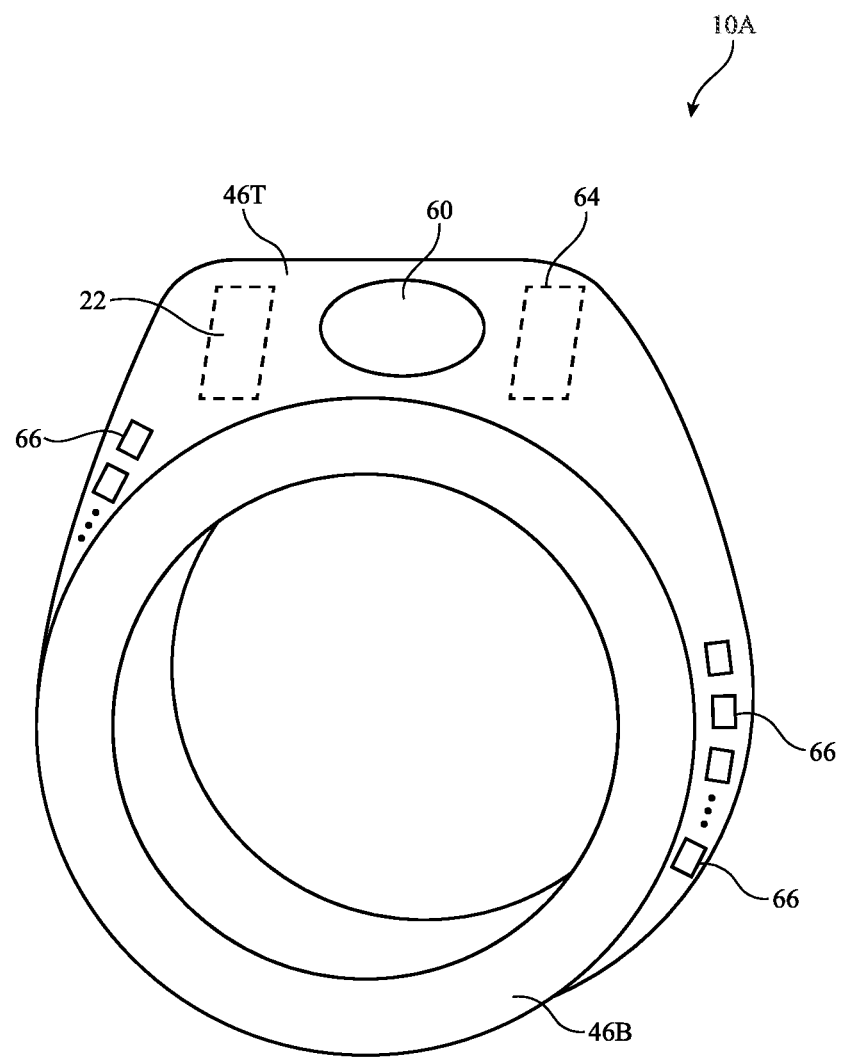
FIG. 5 is a perspective view of an illustrative voice-controlled ring device in accordance with some embodiments.
Figure 6:
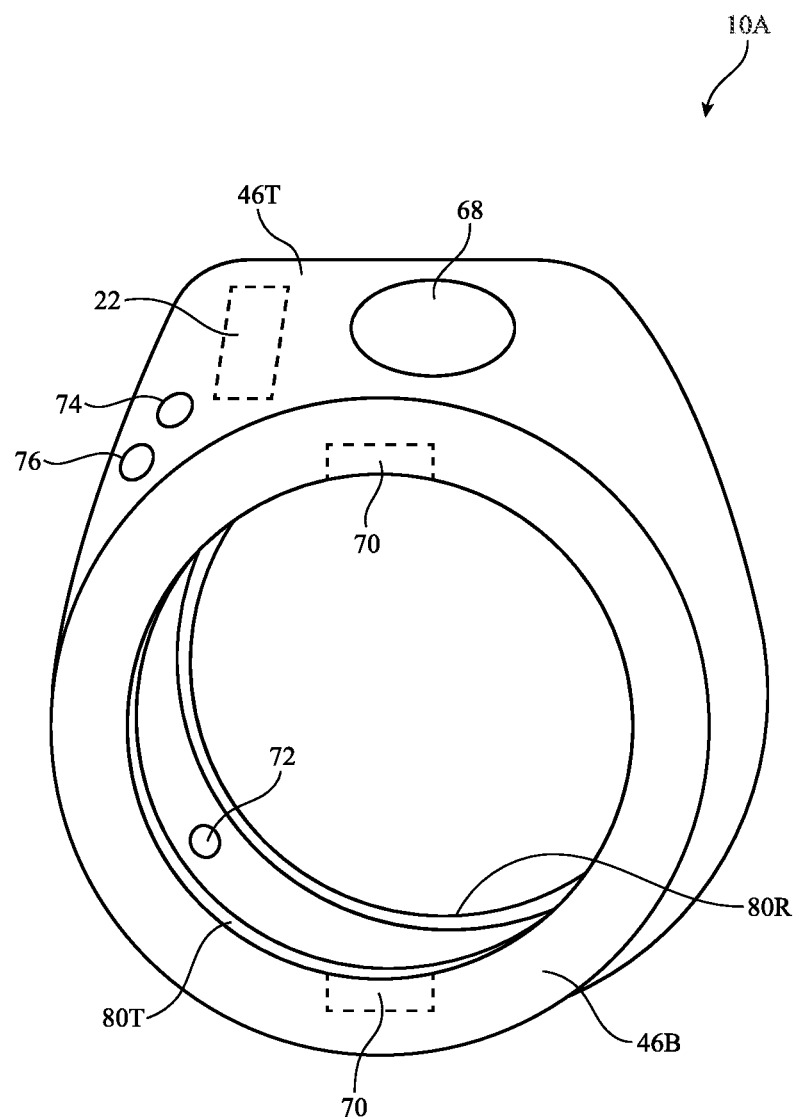
FIG. 6 is a perspective view of an illustrative health-monitoring ring device in accordance with some embodiments.

FIGS. 4, 5, and 6 are perspective views of illustrative ring devices 10A with different sets of components depending on the desired functionality of ring device 10A.

In the example of FIG. 4, ring device 10A is a motion-controlled ring device that includes touch sensor 56, haptic output module 78, inertial measurement unit 22, and components 54. Ring device 10A may be free of near-field communications circuitry, or ring device 10A may include near-field communications circuitry of FIG. 2 such as two-way (e.g., transmitting and receiving) near-field communications coils formed from signal paths 50.

Housing 46 may be entirely curved (e.g., cylindrical, symmetrically curved, asymmetrically curved) or may have one or more planar portions such as top portion 46T.

Touch sensor 56 may be located on the planar surface of top portion 46T of housing 46. Touch sensor 56 may be configured to receive touch input from a user's finger. Touch sensor 56 may be a one-dimensional or two-dimensional array of capacitive touch sensors or may be based on other touch technologies such as acoustic, optical, or resistive touch technologies. Touch sensor 56 may be configured to gather multitouch input, tap input, swipe input, and/or any other suitable touch input. If desired, touch sensor 56 may be force-sensitive and may be configured to determine amount of force with which a user's finger touches sensor 56. Touch sensor 56 may be configured to gather biometric data such as fingerprint data. For example, touch sensor 56 may include a capacitive, optical, or ultrasonic fingerprint sensor. Fingerprint information may be used for enrollment purposes (e.g., to enroll a user into a user profile on device 10A) and/or for biometric authentication purposes (e.g., to determine the identity of the user wearing device 10A). If desired, touch sensor 56 may be a tactile button or tactile switch (e.g., a mechanical button) that gathers button press input.

Haptic output device 78 may be a vibrator, electromagnetic actuator, piezoelectric actuator, and/or other device that supplies a user with haptic output. The haptic output may be provided as haptic feedback in response to user input such as touch, force, and/or button press input to touch sensor 56, motion input to motion sensor 22, voice input to a microphone in device 10A, user input to devices 10B, and/or any other suitable user input.

Components 54 may include control circuitry 16, printed circuits (e.g., a main logic board, a flexible printed circuit, etc.), stiffeners (e.g., foam, plastic, metal, etc.), storage and processing circuitry (e.g., control circuitry) for touch sensor 56, haptic output device 78, inertial measurement unit 22, and/or near-field communications circuitry formed by signal paths 50.

Due to space constraints, certain components from FIG. 1 may be omitted from ring device 10A of FIG. 4. For example, health sensors, speakers, displays, ambient light sensors, temperature sensors, ultraviolet light sensors, microphones, and/or other components may be omitted from ring device 10A of FIG. 4 (if desired).

In the example of FIG. 5, ring device 10A is a voice-controlled ring device that includes touch sensor 66, speaker 60, microphone 64, and inertial measurement unit 22.

Touch sensor 66 may be located on the curved surface of ring-shaped portion 46B of housing 46. Touch sensor 66 may be configured to receive touch input from a user's finger. Touch sensor 66 may be a one-dimensional or two-dimensional array of capacitive touch sensors or may be based on other touch technologies such as acoustic, optical, or resistive touch technologies. Touch sensor 66 may be configured to gather multitouch input, tap input, swipe input, and/or any other suitable touch input around some or all of the circumference of housing 46. If desired, touch sensor 66 may be force-sensitive and may be configured to determine amount of force with which a user's finger touches sensor 66.

One or more speakers such as speaker 60 may be mounted in top portion 46T or elsewhere in housing 46 and one or more microphones such as microphone 64 may be mounted in housing 46.

Components such as control circuitry 16, printed circuits (e.g., a main logic board, a flexible printed circuit, etc.), stiffeners (e.g., foam, plastic, metal, etc.), storage and processing circuitry (e.g., control circuitry) for touch sensor 66, speaker 60, and/or microphone 64 may be mounted in housing 46.

Due to space constraints, certain components from FIG. 1 may be omitted from ring device 10A of FIG. 5. For example, health sensors, displays, ambient light sensors, temperature sensors, ultraviolet light sensors, near-field communications circuitry, fingerprint sensors, haptic output devices, and/or other components may be omitted from ring device 10A of FIG. 5 (if desired).

In the example of FIG. 6, ring device 10A is a health-monitoring ring device that includes electrocardiogram sensor 68, inertial measurement unit 22, photoplethysmogram sensors 70, ambient light sensor 74, ultraviolet light sensor 76, temperature sensor 72, inertial measurement unit 22, and conductive rings 80T and 80R.

Electrocardiogram sensor 68 may be located in top portion 46T of housing 46 and may be configured to gather heart rate data. Photoplethysmogram sensors 70 may be mounted on an interior surface of ring-shaped portion 46B and may be configured to measure blood oxygen levels, blood flow, and/or heart rate. Temperature sensor 72 may be mounted on an interior surface of ring-shaped portion 46B and may be configured to measure a user's body temperature. If desired, temperature sensor 72 may additionally or alternatively be mounted on an exterior surface of ring-shaped portion 46B and may be configured to measure ambient temperature. Ambient light sensor 74 may be configured to measure the brightness and/or color of ambient light. Ultraviolet light sensor 76 may be configured to measure ultraviolet light to determine an amount of ultraviolet light that the user is being exposed to. Conductive rings 80T and 80R may be located on an interior surface of ring-shaped housing portion 46B and may contact a user's finger when device 10A is being worn. Conductive ring 80T may be a transmitting ring and conductive ring 80R may be a receiving ring. Conductive rings 80T and 80R may be used for detecting changes in resistance, grip sensing, and/or other purposes. These examples are merely illustrative. If desired, the components of ring device 10A may be mounted in other locations of housing 46.

Due to space constraints, certain components from FIG. 1 may be omitted from ring device 10A of FIG. 6. For example, displays, near-field communications circuitry, fingerprint sensors, haptic output devices, microphones, speakers, touch sensors, force sensors, and/or other components may be omitted from ring device 10A of FIG. 6 (if desired).

Figure 7:
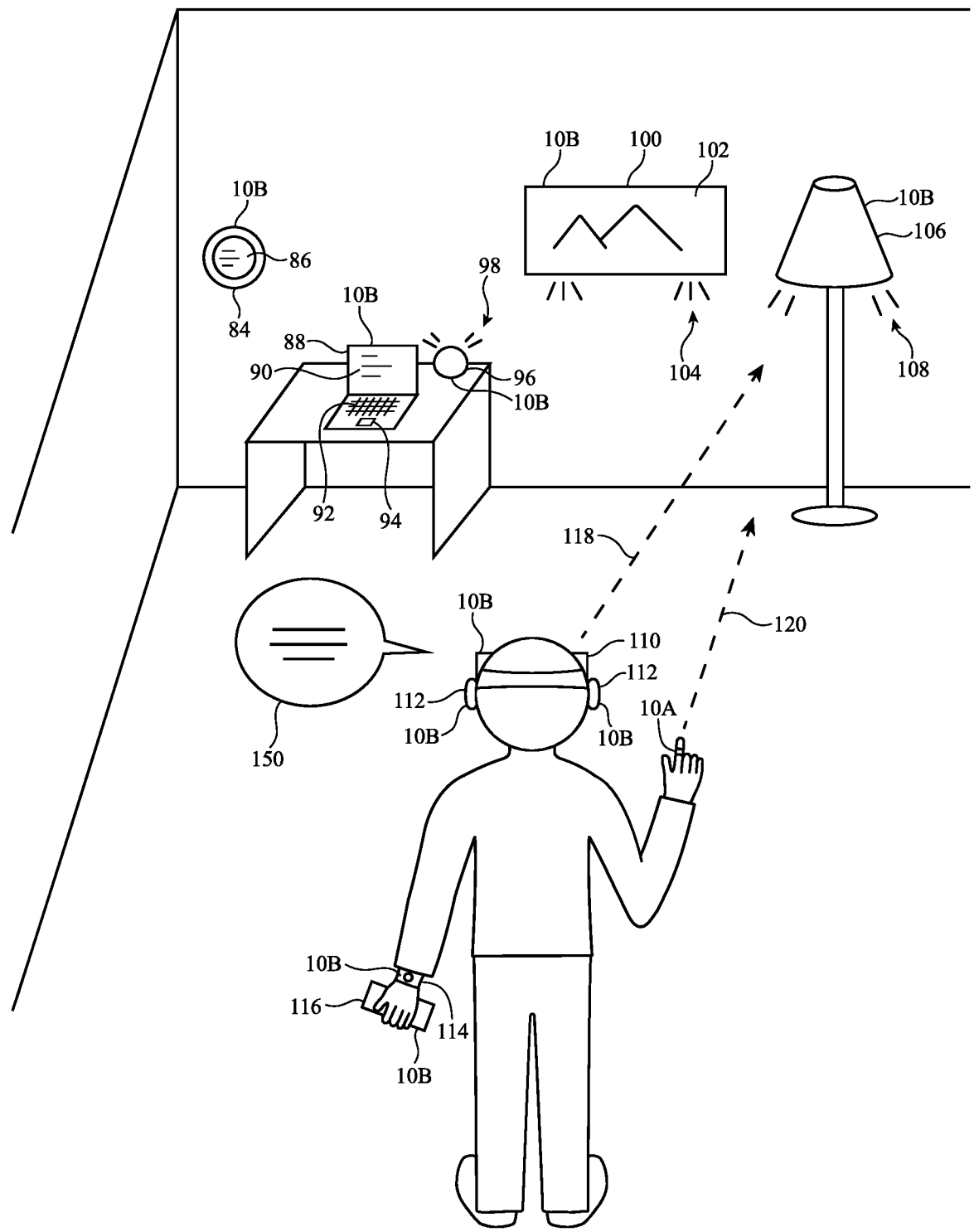
FIG. 7 is a perspective view of an illustrative environment in which a ring device may be used to control other electronic devices in accordance with some embodiments.

FIG. 7 is a diagram showing an illustrative environment in which system 8 may operate. The devices 10A and 10B shown in FIG. 7 are merely illustrative examples. If desired, different and/or additional devices 10A and 10B may be included in system 8.

In the example of FIG. 7, a user is wearing device 10A on the user's finger while interacting with one or more devices 10B in the user's environment. Device 10A may be a ring device of the type described in connection with FIGS. 1-6. Devices 10B may be electronic devices that can be controlled using ring device 10A and/or that serve as host devices for assisting in the control of other devices 10B using ring device 10A. Devices 10B may include wristwatch device 114, cellular telephone 116, headphones 112, head-mounted device 110, laptop computer 88, speaker 96, thermostat 84, television 100, and lamp 106.

Ring device 10A may be used to adjust output from devices 10B, to adjust the operational settings of devices 10B, and/or to take other actions with respect to devices 10B. As examples, user input or other input gathered with ring device 10A may be used to adjust display output from displays (e.g., to control display content 90 on laptop 88, display content 102 on television 100, and/or display content on head-mounted device 110, wristwatch 114, and/or cellular telephone 116), may be used to adjust audio output from speakers (e.g., to adjust audio output 98 from speaker 96, audio output 104 from television 100, and/or audio output from head-mounted device 110, wristwatch 114, cellular telephone 116, and/or headphones 112), and/or may be used to adjust operational settings (e.g., to adjust settings 86 of thermostat 84, to adjust settings such as brightness and/or color temperature of illumination 108 from lamp 106, and/or to adjust operational settings of other devices such as laptop computer 88, speaker 96, television 100, head-mounted device 110, wristwatch 114, cellular telephone 116, and/or headphones 112).

If desired, a first input may be used to select the device 10B that the user wishes to control with ring device 10A, and a second input may be used to indicate the desired control signal. For example, the first input that is used to select the device 10B that the user wishes to control may be pointing input (e.g., pointing the finger wearing device 10A in pointing direction 120 towards the device 10B that the user wishes to control), gaze input (e.g., by directing gaze direction 118 towards the device 10B that the user wishes to control), voice input (e.g., by saying aloud the name of the device 10B that the user wishes to control), and/or other suitable user input.

The first user input that is used to select the device 10B that the user wishes to control may be detected by ring device 10A and/or a host device 10B. For example, voice input 150 from the user (e.g., voice input indicating which device 10B the user wishes to control) may be detected by a microphone in ring device 10A and/or by a microphone in a host device 10B such as cellular telephone 116, head-mounted device 110, headphones 112, wristwatch 114, and/or other electronic device 10B close enough to the user to detect voice input (e.g., speaker 96). Gaze input from the user (e.g., gaze direction 118) may be detected by a camera or other gaze tracking sensor in head-mounted device 110 and/or cameras in other devices 10B. If desired, gaze direction 118 may be inferred from the user's head position, which may be detected using an inertial measurement unit in headphones 112 (e.g., an inertial measurement unit in headphones 112 may detect that the user's head is pointed in direction 118 towards lamp 106). Pointing input from the user (e.g., pointing direction 120) may be detected by inertial measurement unit 22 and/or other position sensors in ring device 10A, using position sensors in one or more of devices 10B (e.g., cameras or other optical sensors, radio-frequency sensors formed from ultra-wideband transceiver circuitry, Bluetooth® circuitry, wireless local area network circuitry, near-field communications circuitry, 60 GHz communications circuitry, or other radio-frequency circuitry, etc.). For example, the user may tap ring device 10A on the device 10B that the user wishes to select and this tap may be detected by near-field communications circuitry, a proximity sensor, a capacitive sensor, or other sensor in device 10A and/or 10B. Ring device 10A and/or a host device 10B may determine the angle-of-arrival of signals (e.g., ultra-wideband signals, Bluetooth® signals, etc.) received by devices 10B to determine whether ring device 10A and/or host device 10B is pointing or otherwise gesturing towards a given one of devices 10B.

If desired, a first device 10B may be used to detect a first input that indicates the user's selection of a second device 10B. For example, an inertial measurement unit in headphones 112 and/or a gaze tracking sensor in head-mounted device 110 may be used to detect gaze direction 118 that indicates the user's selection of lamp 106.

If desired, the first input that is used to select the device 10B that the user wishes to control may not be an intentional selection input. For example, control circuitry 16 and/or 36 may use sensors or other input devices in ring device 10A and/or device 10B to infer which device is being selected by the user based on the natural actions that the user is currently taking. This may include, for example, using a microphone in ring device 10A or device 10B to detect typing sounds (indicating that the user is typing on keyboard 92 of laptop 88 and therefore wishes ring device input to be directed to laptop 88), swiping sounds (indicating that the user is providing trackpad input to trackpad 94 of laptop 88 and therefore wishes ring device input to be directed to laptop 88), or other sounds indicative of device selection, using sensors in ring device 10A or device 10B to detect a user's hand shape (e.g., a typing hand shape indicating that the user is typing on keyboard 92 of laptop 88 and therefore wishes ring device input to be directed to laptop 88, a trackpad hand shape indicating that the user is proving touch input to trackpad 94 of laptop 88 and therefore wishes ring device input to be directed to laptop 88, etc.), and/or using any other input device that is currently receiving user input as a signal that ring device input to device 10A should be used to control the device 10B that is currently receive user input.

If desired, control circuitry 16 in ring device 10A and/or control circuitry 36 in host device 10B may use contextual information to help determine which electronic device 10B the user is selecting to control with ring device 10A. For example, the control circuitry may take into account contextual information such as which device 10B the user was last using, which devices 10B are turned on, which devices 10B are actively playing music, actively displaying content, and/or otherwise actively providing output, which devices 10B the user typically interacts with at a particular time of day, and/or other information to help prioritize devices 10B and more accurately interpret user input such as gaze input and pointing input. As examples, when a user gazes or points in the general direction of speaker 96 and laptop 88, and laptop 88 is powered off while speaker 96 is actively providing audio, control circuitry 16 and/or 36 may determine that the user is most likely selecting speaker 96. When a user gazes or points in the general direction of lamp 106 and television 100 when both devices are turned off, control circuitry 16 and/or 36 may determine that the user is most likely selecting lamp 106 if the sun has recently set and/or if ambient light is low. Device 10A and/or device 10B may implement machine learning models to help learn typical user behaviors over time and to predict user selections more accurately based on contextual information. Contextual information that allows for better predictions on which device 10B the user is selecting may be gathered by sensors or other input-output devices in ring device 10A and/or in a host device 10B.

In some scenarios, the devices 10B that serve as host devices for ring device 10A may dynamically change during use of ring device 10A. For example, it may be natural for the user to interact with a cellular telephone 116, wristwatch 114, head-mounted device 110, and headphones 112 throughout the day at different times. These devices, which are typically kept near the user's hands, head, pocket, body, etc., may serve as host devices for ring device 10A at the same time or at different times, depending on when those devices are in use. For example, a gaze tracker in head-mounted device 110 may be used to detect gaze direction 118 when head-mounted device 110 is being worn, whereas an inertial measurement unit in headphones 112 may be used to infer gaze direction 118 when headphones 112 are being worn and head-mounted device 110 has been removed.

Once the user has selected the device 10B that the user wishes to control with ring device 10A, one or more second inputs may be provided to ring device 10A to control the selected device 10B. This may include touch input, force input, or biometric input detected by touch sensor 56 or 66, voice input 150 detected by microphone 64, gesture input or other motion input detected by inertial measurement unit 22, and/or other suitable input.

As examples, a single tap or button press on touch sensor 56 may be used to turn the selected device 10B on or off, an upward or downward swipe on touch sensor 56 may be used to increase or decrease the volume of audio coming from the selected device 10B (e.g., audio 98 or 104), to increase or decrease the brightness of light coming from the selected device 10B (e.g., the brightness of light 108, display content 90, display content 102, etc.), or to increase or decrease the temperature setting of thermostat 84. A right or left swipe on touch sensor 56 may be used to increase or decrease the color temperature of light coming from the selected device 10B (e.g., the color temperature of light 108, the white point of display content 90, the white point of display content 102, etc.), to go to a previous or next audio track, etc. A longer touch or press on touch sensor 56 may send different control signals to the selected device 10B than a short tap on touch sensor 56. The various inputs that can be provided to ring device 10A may be assigned different user input functions based on which device 10B is being controlled (e.g., taps on touch sensor 56 may have one user input function for one device 10B and a different user input function for another device 10B).

Hand gestures, finger gestures, and other motions made with ring device 10A may also be used to control devices 10B. Taps, three-dimensional air gestures, pointing input, and/or other motions made with ring device 10A may be used to select, highlight, move, or otherwise manipulate a displayed visual element on the selected device 10B (e.g., virtual reality content or other visual content being presented with a head-mounted device such as head-mounted device 110 or other device 10B with a display). As an example, a user may make an air gesture with device 10A such as waving device 10A to the left to move visual content to the left. System 8 may use an inertial measurement unit in device 10A to detect the left hand wave gesture and can move visual elements being presented to the user with a display in the selected device 10B in response to the left hand wave gesture. As another example, a user may select a visual element in the user's field of view by tapping on that element with device 10A and/or pointing towards the element with device 10A.

If desired, a camera in one of devices 10B such as head-mounted device 110 may face the eyes of a user. The camera and/or other circuitry of the gaze tracking system may monitor the direction in which a user is viewing real-world objects and visual content such as content 90, content 102, and/or virtual reality content on head-mounted device 110. As an example, a camera may be used to monitor the point of gaze (direction of gaze) of a user's eyes as the user is interacting with virtual content presented by device 110 and as the user is wearing ring device 10A. Control circuitry 16 in device 10A and/or control circuitry 36 in device 10B (e.g., head-mounted device 110) may measure the amount of time that a user's gaze dwells in particular locations and can use this point-of-gaze information in determining when to select virtual objects. Virtual objects can also be selected when it is determined that a user is viewing a particular object (e.g., by analyzing point-of-gaze information) and/or when it is determined that a user has made a voice command, finger input, button press input, or other user input to select the particular object that is being viewed. Point-of-gaze information can also be used during drag and drop operations (e.g., to move virtual objects in accordance with movement of the point-of-gaze from one location in a scene to another).

Figure 8:
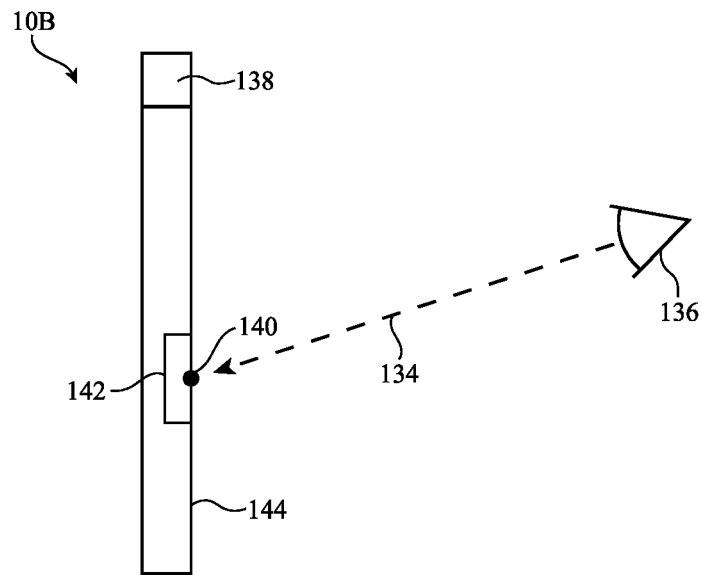
FIG. 8 is a side view of an illustrative system having a computer with a computer housing in which a display is mounted or other equipment with a display and having a gaze tracker in accordance with some embodiments.

Consider, as an example, a scenario of the type shown in FIG. 8. In this example, device 10B has a housing in which gaze tracker 138 has been mounted for monitoring a user's eyes 136. Device 10B may include a display such as display 144. Display 144 may be configured to display images for the user. The image may include one or more objects (e.g., visual items) such as object 142. Control circuitry in device 10B may use gaze tracker 138 to determine the direction 134 in which the user is viewing display 144 or other object. Using direction 134 and/or other information from gaze tracker 138 and/or other sensors (e.g., a depth sensor and/or other sensors that determine the distance of the user from device 10B), device 10B may determine the location of the user's point-of-gaze 140 on display 144. For example, device 10B can determine whether a virtual object such as object 142 on display 144 is currently being viewed by the user.

Figure 9:
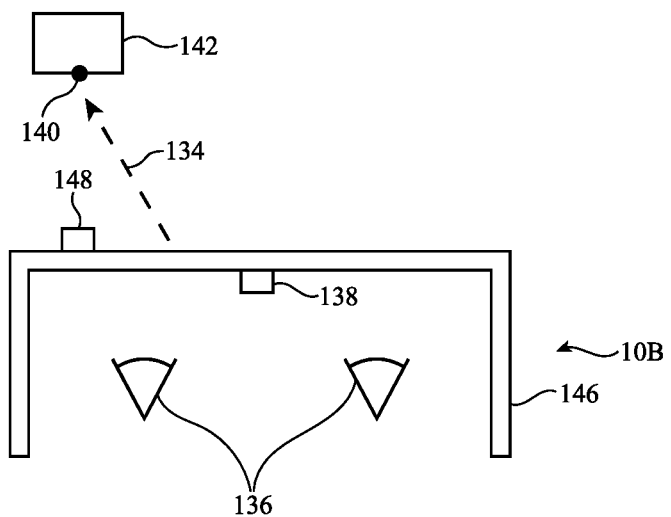
FIG. 9 is a top view of an illustrative head-mounted device having support structures configured to support a display and sensors such as a gaze tracker and forward facing camera in accordance with some embodiments.

Another illustrative system with gaze tracking is shown in FIG. 9. In the example of FIG. 9, device 10B is a head-mounted device having a head-mounted support structure 146 (sometimes referred to as a head-mounted housing) that is configured to be worn on the head of a user. Rear facing gaze tracking system 138 may monitor user's eyes 136 to determine the direction 134 of the user's gaze. Additional sensors (e.g., depth sensor 148) may be used in determining the location and/or other attributes of objects in the user's field of view such as object 142 of FIG. 9. Object 142 may be a real-world object (e.g., a table surface, an inanimate object with circuitry such as one or more devices 10B, a non-electronic inanimate object such as a pencil, ball, bottle, cup, table, wall, etc.) or may be a computer-generated (virtual) object that is being presented to the user's eyes 136 by a display in device 10B (e.g., a see-through display system or a display system in which virtual content is overlaid on real-world images on the display that have been captured with camera 148). Using information on the direction 134 of the user's gaze and information on the relative position between the user and object 142 (e.g., information from a depth sensor in device 10B and/or information on virtual objects being presented to the user), device 10B may determine when the user's point-of-gaze 140 coincides with object 142.

Arrangements of the type shown in FIGS. 8 and 9 allow a user to interact with real-world content and computer-generated (virtual) content. For example, a user may select an object of interest by directing point-of-gaze 140 towards that object (e.g., for more than a predetermined dwell time and/or until associated user input such as finger input is received to confirm selection). Using ring device(s) 10A and/or other equipment in system 8, the user may perform operations on the selected object. For example, an object that is selected by a lingering point-of-gaze or other selection action may be manipulated using two-dimensional touch input gathered using touch sensor 56, using force input gathered using sensor 56, using tap input gathered by an accelerometer in inertial measurement unit 22 of device 10A, using motion input gathered by inertial measurement unit 22 and/or position tracking circuitry, or using other input gathered using other sensors 20. Examples of virtual object manipulations that may be performed based on two-dimensional touch input, gesture input, and/or other sensor input include object translations, rotations, resizing operations, alterations of other visual properties such as colors, textures, brightness levels, and/or contrast settings, etc.

Real-world objects can also be manipulated. These objects may include, for example, real-world devices such as electronic systems in a home or office, electronic devices such as portable electronic devices, and/or other electronic equipment, computers, home automation systems, lighting, heating and ventilation systems, window blinds, door locks, security cameras, thermostats, audio systems, audio-visual equipment such as televisions, set-top boxes, voice assistant speakers, and/or other electronic equipment (e.g., devices including components such as the circuitry of devices 10B). Examples of real-life object manipulations that may be performed on a selected object include adjusting the brightness of a lightbulb (part of a wireless lighting system), adjusting the temperature of a thermostat, adjusting the operation of a computer, adjusting a television (e.g., changing channels, adjusting volume, changing video and/or audio sources, selecting tracks and video clips to play, etc.), adjusting speaker volume, skipping tracks, etc.

If desired, objects may be selected by detecting when device 10A is pointing at an object of interest (e.g., by tracking the location of objects and/or device 10A using a camera in device 10B or device 10A and by determining the orientation and pointing direction of device 10A using inertial measurement unit 22 or other orientation sensor in device 10A and/or by using radio-frequency sensors and/or using the camera to track the location and orientation of device 10A using optical tracking elements on device 10A). Relative position determination and object selection may be performed using radio-frequency sensors (e.g., IEEE ultra-wideband sensors) for detecting the orientation and location of device 10A and determining the range of an object, etc. and/or using other sensors 20.

Consider, as a first example, a scenario in which object 142 is a computer-generated icon. In this situation, after aligning point-of-gaze 140 to overlap the computer-generated icon and thereby select the icon for further action, a user may supply a command with ring device 10A and/or other input components in system 8 that direct system 8 to commence an associated operation in system 8. If, as an example, the icon is an email icon, system 8 may, upon receipt of user input to device 10A, launch an email program on device 10B.

In a second example, object 142 is a real-world object such as a non-electronic inanimate object (e.g., an object being viewed by the user of device 10B of FIG. 9 while device 10B is being worn on the head of the user). In response to detecting that the user's point-of-gaze 140 is directed at object 142 and in response to receipt of input to ring device 10A, device 10B may generate a virtual object that overlaps all or part of object 142 in the user's field of view. Other operations may include, magnifying part of object 142, changing the color or texture of object 142, adding an outline around object 142, adding graphical elements that are aligned with object 142, and/or taking other suitable actions.

In a third example, object 142 is a real-world object that includes circuitry. Object 142 may be, for example, a wireless speaker or other electronic device 10B. In response to detecting that the user's point-of-gaze 140 is directed at object 142 and in response to receipt of user input to ring device 10A, device 10B may adjust the output volume of the speaker. If the object that coincides with point-of-gaze 142 is a device such as a television, the channel of the television may be changed in response to the user input to device 10A. In this way, a user can interact with electronic devices 10B around the user's home, office, or other environment simply by gazing at the objects and supplying additional input to device 10A in coordination with this point-of-gaze selection. Point-of-gaze dwell time, eye blinks, and other eye activity may also be used as a user input.

Figure 10:
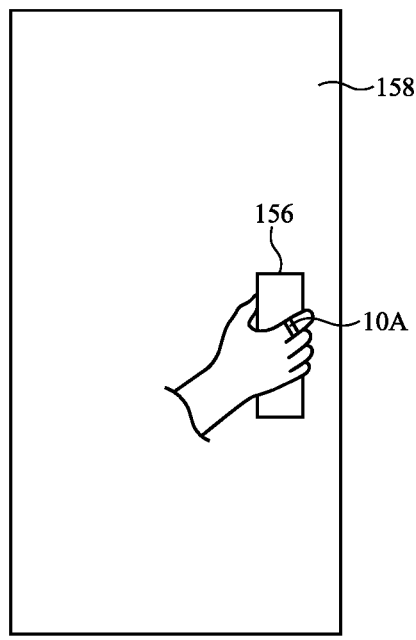
FIG. 10 is a side view of an illustrative ring device being worn on a hand that is gripping a door handle in accordance with some embodiments.

Ring device 10A may be comfortable enough to wear for long periods of time (e.g., throughout the day, overnight, etc.). If desired, input may be gathered by ring device 10A and/or output may be provided from ring device 10A during the user's normal day-to-day activities without requiring the user to intentionally direct attention towards ring device 10A. For example, a user may wear ring device 10A while gripping a door handle as shown in FIG. 10. The grip on door handle 156 of door 158 may be detected by inertial measurement unit 22 of device 10A, near-field communications circuitry of device 10A, conductive rings 80T and/or 80R of device 10A, touch sensor 56 or 66 of device 10A, and/or other sensors in device 10A. One or more actions may automatically be triggered in response to detecting a user's grip on door handle 156. For example, in response to detecting the user's grip on door handle 156, near-field communications tag emulator 38 may emulate an appropriate near-field communications tag that is then read by a near-field communications reader associated with door 158 to provide a user with access through door 158. If desired, emulator 38 may only initiate tag emulation if the user wearing device 10A has been previously authenticated (e.g., using a fingerprint sensor such as sensor 56 of device 10A).

Figure 11:
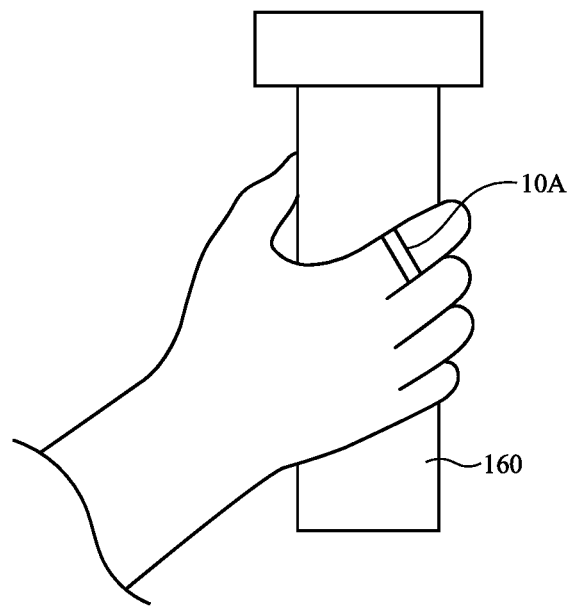
FIG. 11 is a side view of an illustrative ring device being worn on a hand that is gripping a medicine bottle in accordance with some embodiments.

In the example of FIG. 11, a user is wearing ring device 10A while gripping a medicine bottle 160. The grip on medicine bottle 160 may be detected by inertial measurement unit 22 of device 10A, near-field communications circuitry of device 10A, and/or other sensors in device 10A. One or more actions may automatically be triggered in response to detecting a user's grip on medicine bottle 160. For example, in response to detecting the user's grip on medicine bottle 160, near-field communications tag reader 36 may read a near-field communications tag on medicine bottle 160 and a log entry may automatically be made in an associated health-monitoring application (e.g., a medicine log, a health log, a doctor's log, etc.) running on a companion device 10B (e.g., a user's cellular telephone or other device 10B). The application may automatically open on the companion device 10B or the medicine log entry may be logged in the application without opening the application on companion device 10B.

Figure 12:
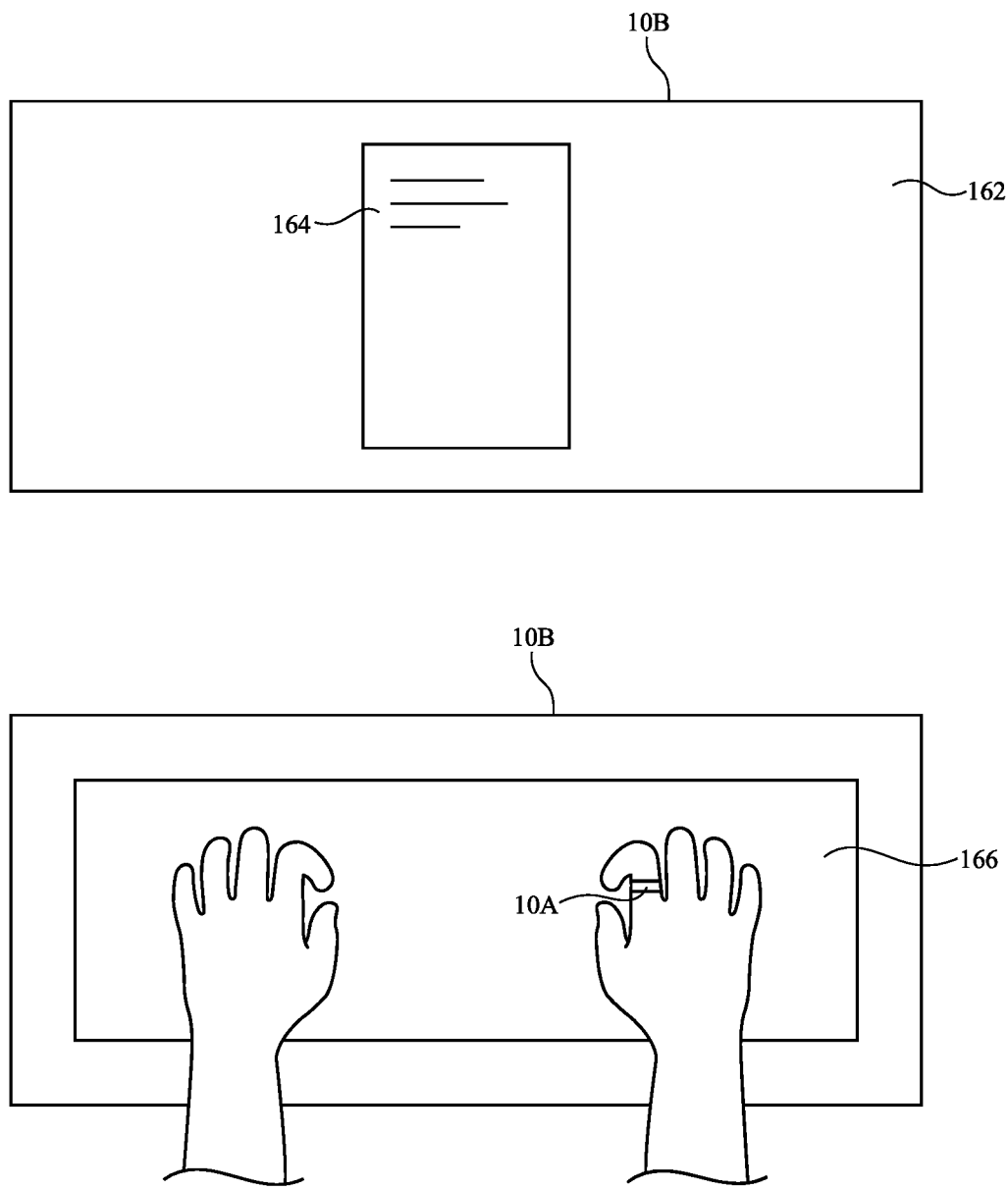
FIG. 12 is a side view of an illustrative ring device being worn on a hand that is typing on a keyboard in accordance with some embodiments.

In the example of FIG. 12, a user is wearing device 10A while typing on keyboard 166 to provide keyboard input to display 162 of device 10B. Display 162 may be configured to display visual content such as display content 164. The typing motion on keyboard 166 may be detected by inertial measurement unit 22 of device 10A and/or the typing sound on keyboard 166 may be detected by microphone 64 of device 10A. One or more actions may automatically be triggered in response to detecting a user's typing on keyboard 166. For example, in response to detecting typing motion and/or typing sounds, ring device 10A may automatically transfer data from ring device 10A the laptop or other computer that receives input from keyboard 166 (e.g., biometric data gathered with ring device 10A may be used to authenticate device 10B and/or authorize purchases made on device 10B, health data gathered using health sensors in ring device 10A may be conveyed to device 10B, etc.). If desired, touch input to touch sensor 56 or 66 of device 10A may be used as trackpad input to manipulate display content 164 on display 162 of device 10B.

Figure 13:
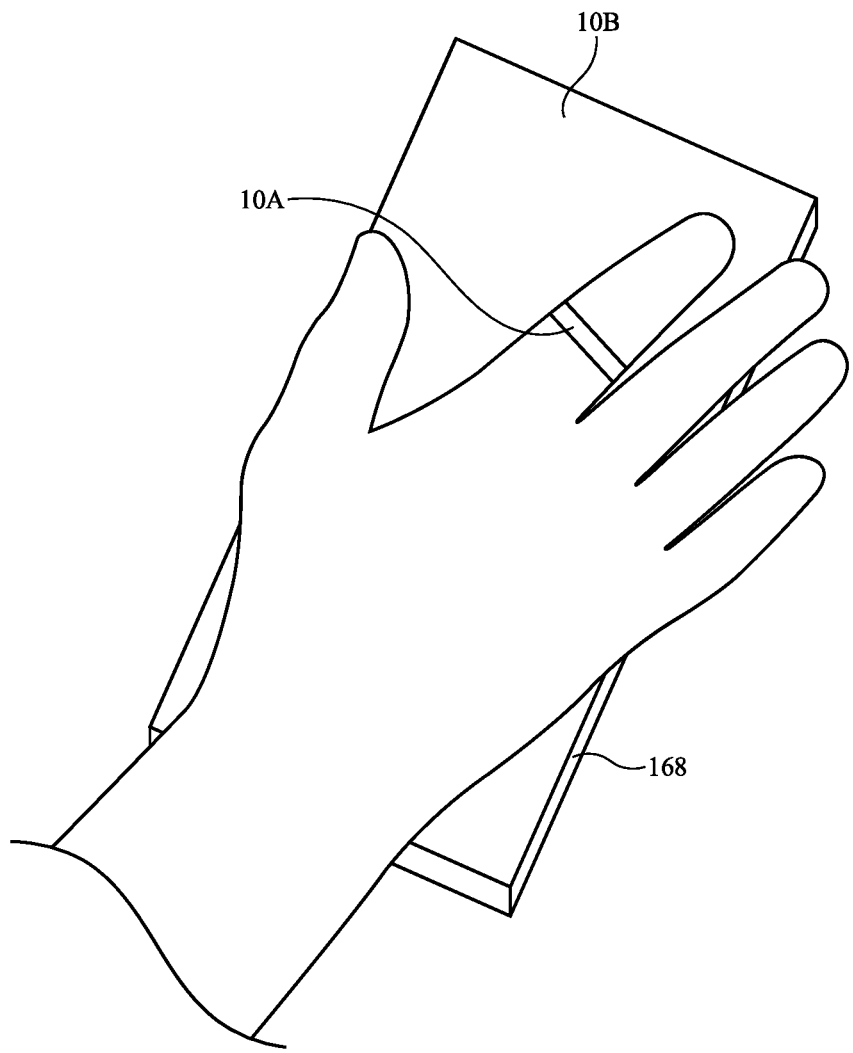
FIG. 13 is a side view of an illustrative ring device being worn on a hand that is gripping a cellular telephone, tablet computer, or other electronic device in accordance with some embodiments.

In the example of FIG. 13, a user is wearing device 10A while holding device 10B (e.g., a cellular telephone, tablet computer, or other device). Using conductive elements in ring device 10A (e.g., conductive rings 80T and 80R), conductive elements in device 10B (e.g., a conductive housing structure, an antenna, etc.), and the natural conductivity of human skin, electrical signals may be conveyed between devices 10A and 10B across the user's skin. The grip on device 10B may be detected using these electrical signals, using inertial measurement unit 22 of device 10A, using near-field communications circuitry of device 10A, and/or using other sensors in device 10A. One or more actions may automatically be triggered in response to detecting a user's grip on device 10B. For example, in response to detecting the user's grip on device 10B, ring device 10A may automatically transfer data from ring device 10A to device 10B (e.g., biometric data gathered with ring device 10A may be used to authenticate device 10B and/or automatically unlock device 10B, health data gathered using health sensors in ring device 10A may be conveyed to device 10B, etc.).

Figure 14:
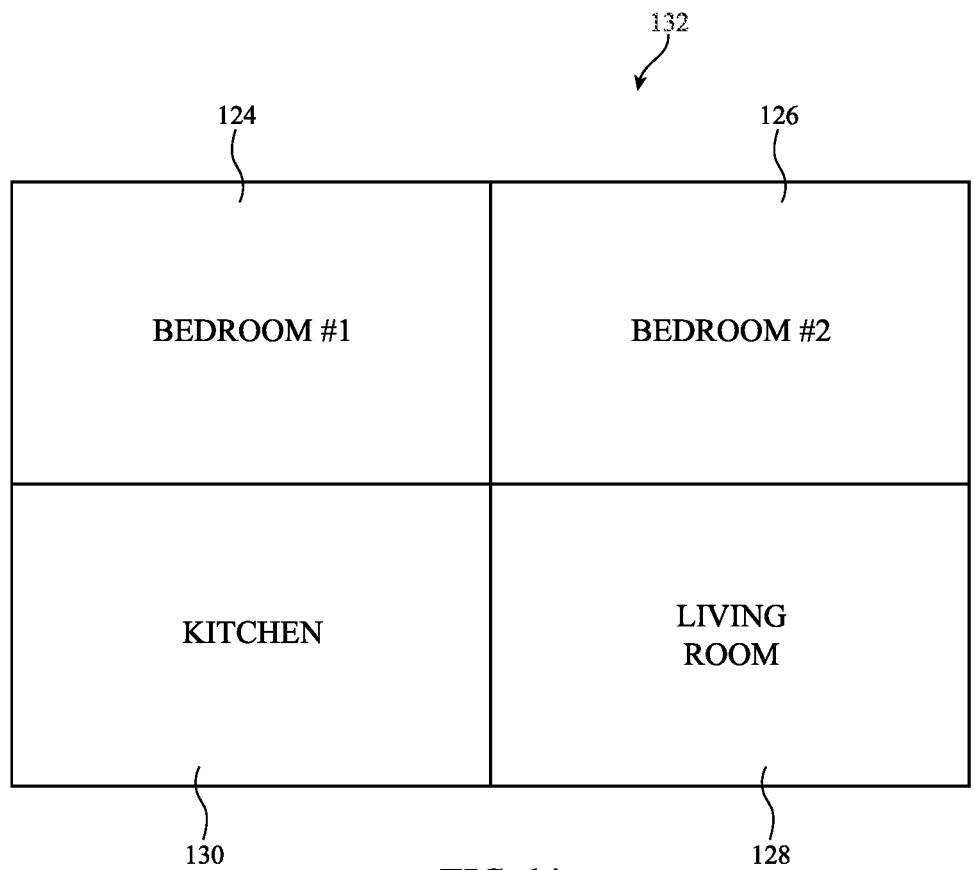
FIG. 14 is a diagram of an illustrative map that stores locations of electronic devices in different rooms in accordance with some embodiments.

If desired, control circuitry 16 in ring device 10A and/or control circuitry 36 in host device 10B may store one or more maps of different rooms that contain various pieces of electronic equipment (e.g., devices 10B) that can be controlled with ring device 10A. As shown in FIG. 14, for example, control circuitry 16 and/or 36 may store a map such as map 132 of electronic devices in the user's home. In one illustrative arrangement, map 132 may be a single undivided map indicating the locations of one or more electronic devices throughout one or more rooms in the home. In other arrangements, map 132 may include maps of individual rooms in the user's home such as a kitchen map 130, a living room map 128, a first bedroom map 124, and a second bedroom map 126. Each room map (e.g., room maps 130, 128, 124, and 126) in house map 132 may indicate the locations of one or more electronic devices 10B in a given room (e.g., kitchen, living room, first bedroom, second bedroom, etc.). This information may then be used by ring device 10A and/or host device 10B to determine which device the user wishes to control with ring device 10A.

Figure 15:
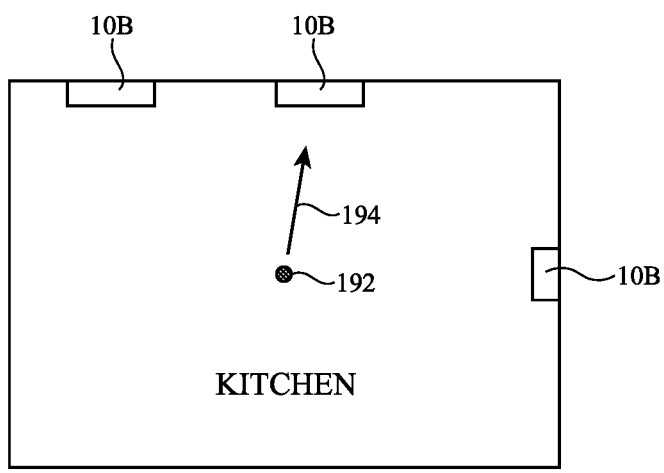
FIG. 15 is a diagram of an illustrative environment in which a stored map may be used to determine which electronic device is being selected by a user wearing a ring device in accordance with some embodiments.

By storing one or more maps with the locations of different electronic devices 10B, control circuitry 16 and/or 36 may be able to determine which device 10B is aligned with the user's gaze direction (e.g., gaze direction 118 of FIG. 7) or pointing direction (e.g., pointing direction 120 of FIG. 7). For example, as shown in FIG. 15, a user may be located in location 192 of the user's kitchen. While wearing ring device 10A, the user may point and/or gaze in direction 194 towards a given one of devices 10B in the kitchen. Control circuitry 16 and/or 36 may use sensors (e.g., inertial measurement units, cameras, radio-frequency sensors, etc.) in device 10A and/or device 10B to determine the direction 194 of the user's gaze or pointing gesture. Control circuitry 16 and/or 36 may then access stored home map 132 and/or stored kitchen map 130 to determine which of devices 10B is aligned with direction 194 of the user's gaze or pointing gesture. Upon determining which device 10B is aligned with direction 194 of the user's gaze or pointing gesture, ring input may be provided to ring device 10A to control that particular device 10B.

Figure 16:
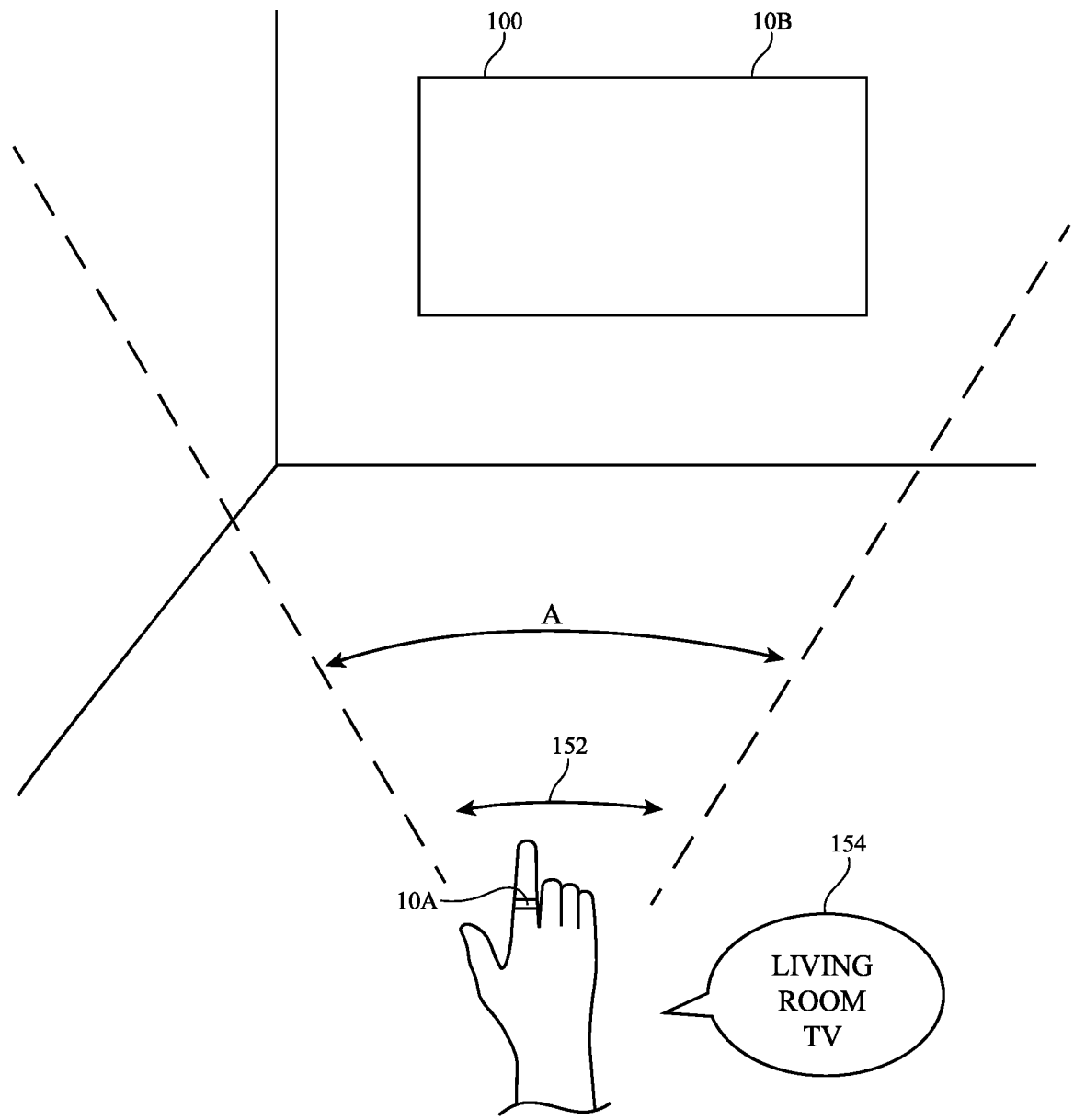
FIG. 16 is a perspective view of an illustrative environment in which a user is wearing a ring device to register the locations of one or more electronic devices during a map generation process in accordance with some embodiments.

Maps such as home map 132, an office map, and/or other maps may be created during a map generation enrollment process with ring device 10A. During map generation operations, a user may wear ring device 10A and/or may hold a host device 10B while registering the locations of other electronic devices 10B in the map. For example, as shown in FIG. 16, the user may wear ring device 10A while pointing at device 10B (e.g., television 100). Television 100 may be a device that the user wishes to store a location for in the map being generated. While pointing at device 10B, the user may provide other input such as voice input 154 that indicates the name of device 10B and, if desired, the room in which device 10B is located (e.g., the user may say "living room TV"). Pointing input (e.g., the direction in which the user is pointing) may be detected by inertial measurement unit 22 in device 10A and voice input 154 may be detected by microphone 64 in device 10A. In response to the detected pointing input and voice input 154, control circuitry 16 and/or control circuitry 36 in host device 10B (e.g., television 100 or a different device 10B such as the user's cellular telephone) may store location information for living room television 100.

If desired, different devices 10B may be assigned different pointing ranges (e.g., three-dimensional cones of space or a two-dimensional range of angles that indicate a selection of that particular device 10B). For example, if the living room only has one electronic device 10B on a given side of the room, then the user may wish to be able to point anywhere in the general direction of that side of the room to select that electronic device 10B. If, on the other hand, more than one electronic device 10B is located in a given portion of a room, the user may need to use a more precise pointing or gazing direction to select one of the devices 10B.

In the example of FIG. 16, television 100 is assigned range A such that pointing or gazing towards television 100 within range A indicates a selection of television 100. Range A may be a range of plane angles (e.g., 30 degrees indicating that only pointing or gazing within 30 degrees of a line extending across the shortest distance between the user's eyes or finger and device 10B can be used to select device 10B) or a range of solid angles (e.g., 30 degrees squared indicating that only pointing or gazing within 30 degrees squared of a line extending across the shortest distance between the user's eyes or finger and device 10B can be used to select device 10B). Range A may be set automatically by device 10A based on the type of device 10B and/or the proximity of the device 10B to other devices 10B. If desired, range A may be set by the user. For example, during the map generation enrollment process, the user may move finger across range A in directions 152 to assign range A to television 100.

If desired, ring device 10A may provide feedback to the user to let the user know that the location of a given one of devices 10B has been properly registered in the map. For example, haptic feedback, audio feedback, and/or visual feedback may be provided from device 10A to inform the user that the location of a particular device 10B has been registered in the map. For example, haptic output module 78 may provide a haptic click or other tactile feedback to indicate that the location of a particular device 10B has been registered in the map, and/or to indicate that a pointing or gaze range has been assigned to device 10B.

Figure 17:
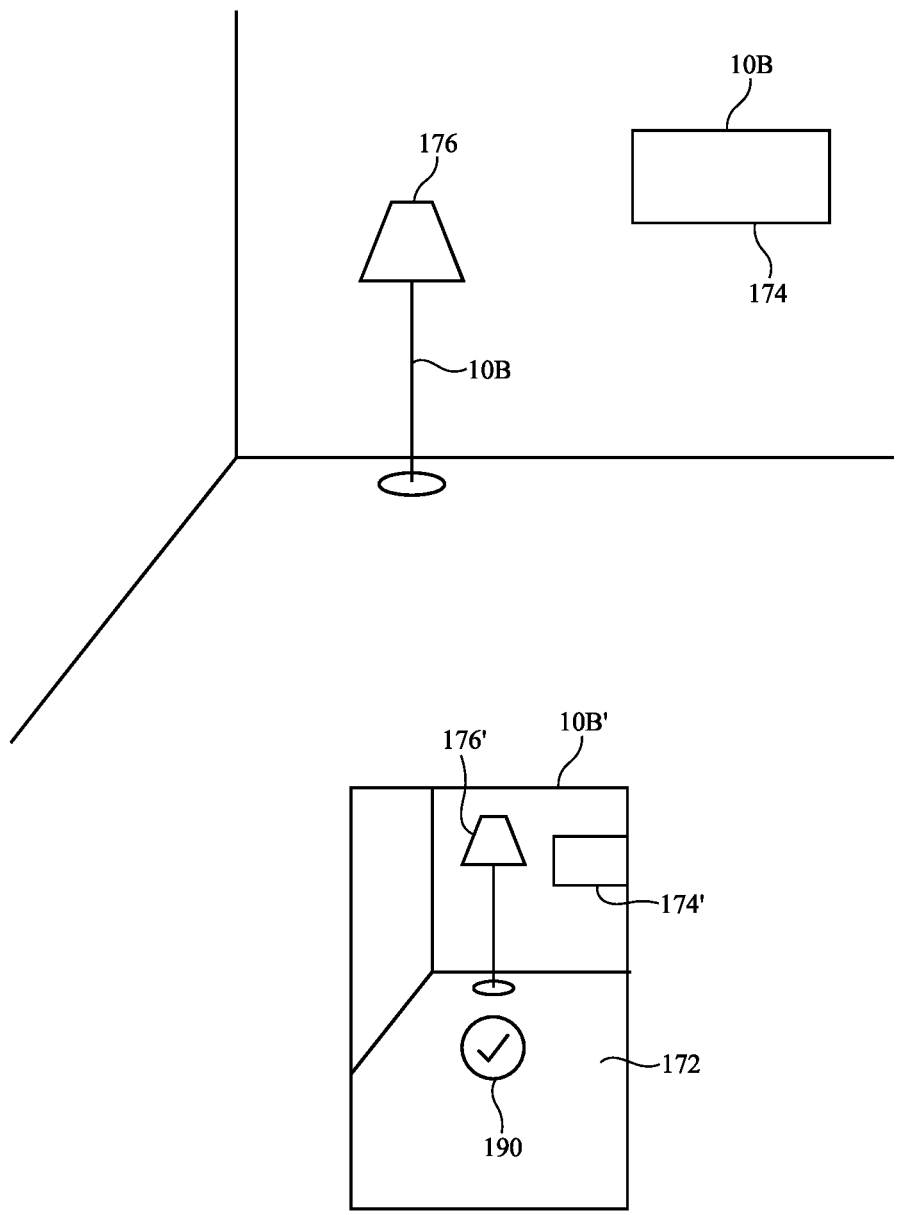
FIG. 17 is a perspective view of an illustrative environment in which a user is using an electronic device with a display to register the locations of one or more electronic devices during a map generation process in accordance with some embodiments.

If desired, a host device 10B may be used during the map generation process in addition to or instead of using ring device 10A. This type of arrangement is illustrated in FIG. 17. Device 10B' of FIG. 17 may serve as a host device that can be used to create a map of electronic devices 10B to be controlled with ring device 10A. Device 10B' may be a cellular telephone, a tablet computer, a head-mounted device, or other suitable electronic device. Device 10B' may have a camera and a display such as display 172. During map generation operations, the user may point the camera of device 10B' towards the user's environment. If desired, a live video feed of the captured images may be displayed on display 172. Electronic devices 10B in the user's environment such as lamp 176 and television 174 may appear on display 172 as lamp 176' and television 174'. Input to device 10B' may be used to register the locations of electronic devices 10B in the user's environment. For example, the user may point the longitudinal axis of device 10B' towards devices 10B, may point the camera of device 10B' towards devices 10B, may provide voice input stating the names of devices 10B and/or the room in which devices 10B are located, may gaze at devices 10B, may gesture towards devices 10B with device 10B', may provide touch input on display 172 (e.g., by tapping or otherwise selecting lamp 176' and television 174' on display 172 to register the locations of lamp 176' and television 174'), and/or may provide other input indicating the locations of electronic devices 10B. Sensors in device 10B' such as gaze tracking sensors, user-facing cameras, radio-frequency sensors, inertial measurement units, other position sensors, and/or other sensors may be used in detecting the locations of electronic devices 10B that are aligned with the user's gaze, pointing direction, gesture direction, etc.

If desired, device 10B' may provide feedback to the user to let the user know that the location of a given one of devices 10B has been properly registered in the map. For example, haptic feedback, audio feedback, and/or visual feedback may be provided from device 10B' to inform the user that the location of a particular device 10B has been registered in the map. In the example of FIG. 17, display 172 may display a visual element such as visual element 190 to indicate that the location of a particular device 10B has been registered in the map. Visual element 190 may be overlaid on top of or adjacent to the device 10B to indicate that the device 10B is properly registered. In arrangements where device 10B' is a head-mounted device, visual element 190 may be a virtual element that is overlaid on top of real-world content such as lamp 176' or television 174'.

Figure 18:
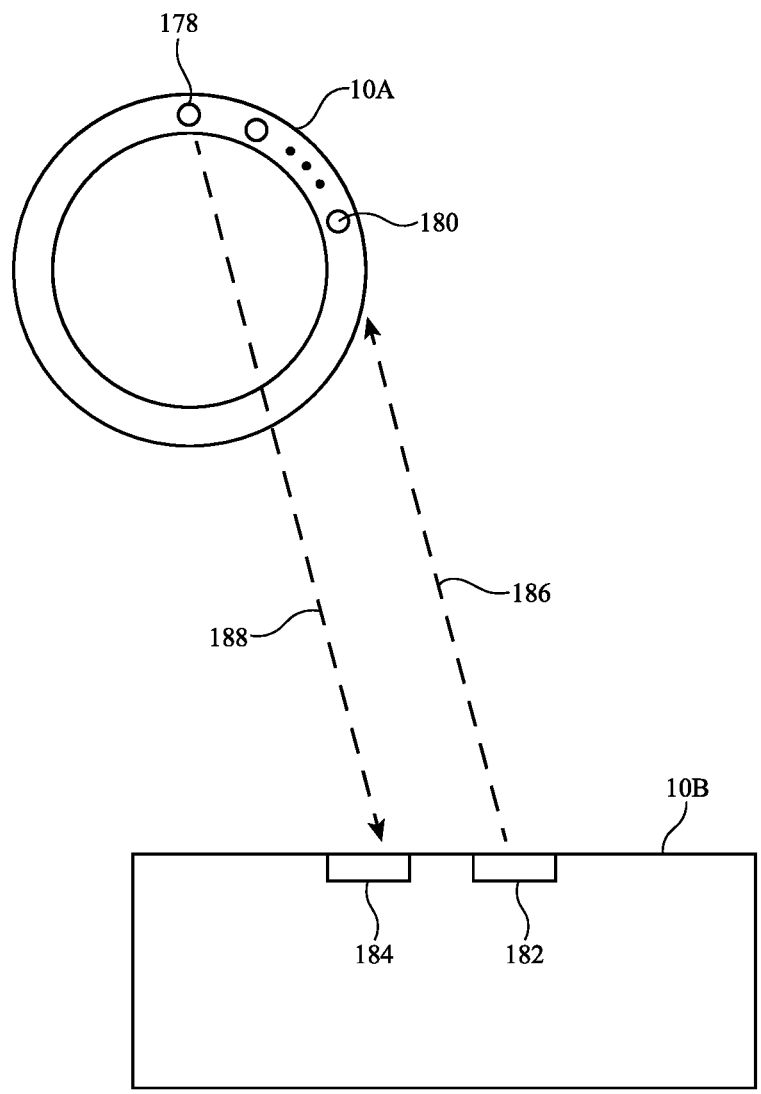
FIG. 18 is a diagram of an illustrative system in which a ring device and an electronic device exchange optical signals during a pairing process in accordance with some embodiments.

FIG. 18 illustrates another technique for registering locations of devices 10B and/or otherwise communicating between ring device 10A and devices 10B. In the example of FIG. 18, ring device 10A has one or more optical emitters 178 and one or more optical detectors 180. Device 10B may include one or more optical emitters 182 and one or more optical detectors 184. Optical emitters 178 may emit light beams 188 towards device 10B and/or optical emitters 182 may emit light beams 186 towards device 10A. Optical emitters 178 and 182 may be lasers, light-emitting diodes (e.g., light-emitting diodes that emit infrared and/or visible light), or other light sources. Optical detectors 180 and 184 may be photodiodes, image sensors, or other light sensors.

Light beams 188 from light emitters 178 of device 10A may be visible light beams that produce a spotlight on the device 10B that the user is pointing towards. This may help guide the user during the map generation process. In other arrangements, light beams 188 may be infrared light beams that may be detected using detectors 184 in device 10B. In response to detecting light beam 188, device 10B may send its location information, device information, and/or other information to device 10A.

Light beams 186 from light emitters 182 of device 10B may contain information such as position information indicating the position of device 10B, the type of device 10B, control functions associated with device 10B, and/or other information. The information may be embedded in the frequency of light beams 186, if desired. In some arrangements, light emitters 182 may serve as optical markers in a virtual reality system and may be repurposed to send location information to ring device 10A during the map generation process. Ring device 10A may use detectors 180 to detect light beam 186 from device 10B.

If desired, optical communication between ring device 10A and device 10B may be used during a pairing process in which devices 10A and 10B exchange signals to pair with one another. The pairing process may include exchanging device identification information, communications capabilities, and/or position information indicating the position of device 10A and/or device 10B.

Figure 19:
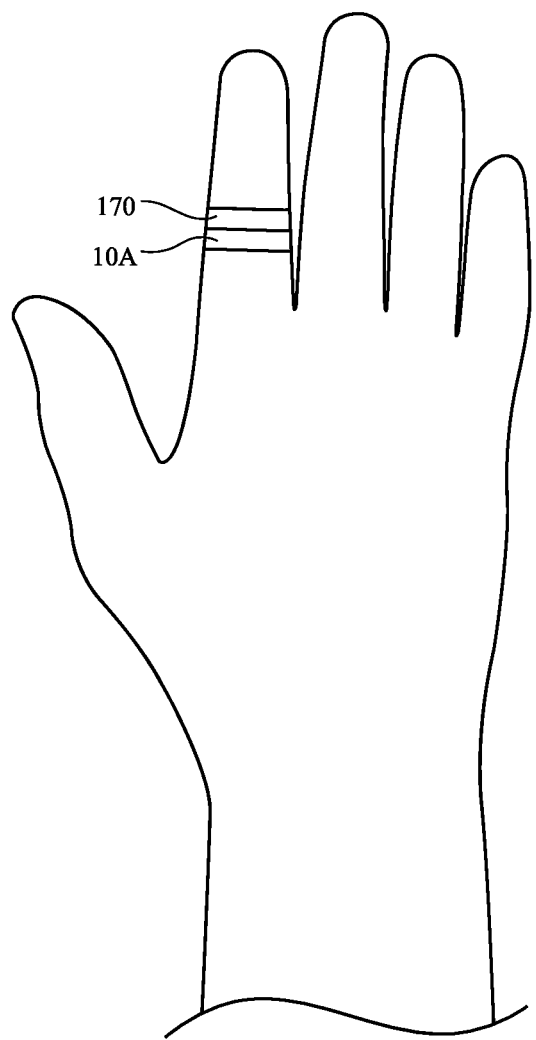
FIG. 19 is a diagram of an illustrative ring device receiving power from a power source ring while the ring device and power source ring are worn on a user's finger in accordance with some embodiments.

Power and communications circuitry 30 in ring device 10A may include a battery. Power can be conveyed to device 10A from an external power source to charge the battery. For example, as shown in FIG. 19, a power source contained within a separate ring device such as power source ring device 170 may be used to convey power to ring device 10A. The user may place power source ring device 170 on the same finger that is wearing ring device 10A so that the two ring devices come into contact with one another.

Power can be conveyed wirelessly between device 170 and device 10A. As an example, contacts (e.g., metal pads) on devices 170 and 10A may be capacitively coupled (without forming ohmic contact) to allow power to be transferred and/or power can be conveyed using a wireless power transmitter with a coil in power source ring 170 to transmit wireless power signals to a wireless power receiver with a coil in device 10A. Inductive power transfer techniques may be used (e.g., wireless power can be transmitted using one or more wireless power transmitting coils in power source ring 170 and transmitted wireless power signals can be received in a power receiving circuit using a power receiving coil in device 10A). Received alternating-current wireless power signals can be converted to direct-current power using a rectifier in the power receiving circuit for charging the battery in device 10A and/or for powering circuitry in device 10A. In configurations in which the power receiving circuit of device 10A receives power via a wired connection (e.g., using terminals), the power receiving circuit may provide the received power to the battery and/or other circuitry in device 10A.

Additionally or alternatively, device 10A may include an internal power source such as an energy harvesting device. The energy harvesting device may be a solar cell that converts ambient light (e.g., sunlight, etc.) into electrical power for powering device 10A (e.g., to power circuitry in device 10 and/or to charge a battery in device 10A). If desired, device 10A may include an energy harvesting device such as an electromechanical system or piezoelectric component that coverts kinetic energy (e.g., kinetic energy associated with vibrations and/or other movement of device 10A as device 10A is worn on a user's finger) to into electrical power for powering device 10A. Energy may also be harvested using a thermoelectric device that converts heat (e.g., body heat) into electrical power, or other energy harvesting devices.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

The invention claimed is:

1. A ring device, comprising:
 a ring-shaped housing configured to be worn on a finger;
 an inertial measurement unit configured to detect a pointing direction of the finger; and
 control circuitry configured to send control signals to an electronic device that is aligned with the pointing direction, wherein the control circuitry is configured to identify the electronic device that is aligned with the pointing direction based on a stored map that identifies locations of respective electronic devices.

2. The ring device defined in claim 1 further comprising a microphone that receives voice input, wherein the stored map identifies the locations of the respective electronic devices in different rooms, and wherein the control circuitry determines which of the different rooms the ring device is located in based on the voice input.

3. The ring device defined in claim 1 wherein the control circuitry is configured to receive global positioning system information from an external electronic device, wherein the stored map identifies the locations of the respective electronic devices in different rooms, and wherein the control circuitry determines which of the different rooms the ring device is located in based on the global positioning system information.

4. The ring device defined in claim 1 further comprising:
a sensor configured to gather biometric data; and
near-field communications circuitry that is configured to emulate a near-field communications tag based on the biometric data.

5. The ring device defined in claim 1 further comprising:
a microphone configured to detect sounds made by a hand of a user, wherein the control circuitry is configured to identify the electronic device based at least partly on the detected sounds, and wherein the control circuitry comprises wireless communications circuitry configured to send the control signals to the identified electronic device.

6. The ring device defined in claim 5 further comprising a speaker, wherein the microphone is configured to detect voice input and wherein the control signals are based on the voice input.

7. The ring device defined in claim 1 further comprising:
health-monitoring sensors mounted in the ring-shaped housing, wherein the health-monitoring sensors are selected from the group consisting of: a photoplethysmogram sensor, an electrocardiogram sensor, a temperature sensor, an ambient light sensor, and an ultraviolet light sensor; and
near-field communications circuitry configured to read a near-field communications tag on a medicine bottle and automatically take action in response to reading the near-field communications tag on the medicine bottle.

8. A ring device, comprising:
a ring-shaped housing configured to be worn on a finger;
an inertial measurement unit configured to detect a pointing direction of the finger during a map generation process;
a microphone configured to detect voice input that identifies an electronic device that is aligned with the pointing direction; and
control circuitry configured to store a location of the electronic device in a map based on the pointing direction and the voice input.

9. The ring device defined in claim 8 wherein the control circuitry is configured to assign a range of angles to the electronic device and wherein the ring device is configured to control the electronic device when the finger is pointed towards the electronic device within the range of angles.

10. The ring device defined in claim 9 wherein control circuitry is configured to assign the range of angles automatically based on distances between the electronic device and other electronic devices.

11. The ring device defined in claim 8 wherein the inertial measurement unit is configured to detect a range of motion of the finger during the map generation process and the control circuitry is configured to assign the range of angles based on the range of motion of the finger during the map generation process.

12. The ring device defined in claim 8 wherein the control circuitry is configured to:
identify a target electronic device using the map, and
send control signals to the target electronic device.

13. A system, comprising:
a ring device; and
a first electronic device configured to generate a map indicating a location of a second electronic device configured to be controlled by the ring device, and wherein the first electronic device comprises:
a camera configured to capture images of an environment that includes the second electronic device;
a sensor configured to receive input identifying the location of the second electronic device;
control circuitry configured to store the location of the second electronic device in the map in response to the input; and
a display configured to display a live video feed of the captured images of the environment and to overlay a computer-generated visual element onto the live video feed in response to storing the location of the second electronic device.

14. The system defined in claim 13 wherein the first electronic device comprises a head-mounted device and wherein the sensor comprises a gaze tracking sensor.

15. The system defined in claim 13 wherein the first electronic device comprises a touch screen and wherein the input comprises touch input.

16. The system defined in claim 13 wherein the ring device comprises a first inertial measurement unit configured to gather first data, the system further comprising:
a third electronic device having a second inertial measurement unit configured to gather second data, wherein the control circuitry is configured to:
identify the second electronic device that is aligned with a gaze direction based on the second data and the map; and
send control signals to the identified second electronic device based on the first data.

17. The system defined in claim 16 wherein the third electronic device comprises a pair of headphones.

18. The system defined in claim 16 wherein the ring device comprises a touch sensor configured to receive touch input and wherein the control signals are based on the touch input.

19. The system defined in claim 16 wherein the second electronic device comprises a display configured to adjust display content in response to the control signals.

20. The system defined in claim 16 wherein the second electronic device comprises a speaker configured to adjust audio output in response to the control signals.

* * * * *